United States Patent
Mizuno et al.

(10) Patent No.: US 11,283,066 B2
(45) Date of Patent: Mar. 22, 2022

(54) COATED NEGATIVE-ELECTRODE ACTIVE MATERIAL FOR USE IN LITHIUM-ION BATTERY, SLURRY FOR USE IN LITHIUM-ION BATTERY, NEGATIVE ELECTRODE FOR USE IN LITHIUM-ION BATTERY, LITHIUM-ION BATTERY, AND METHOD FOR MANUFACTURING COATED NEGATIVE-ELECTRODE ACTIVE MATERIAL FOR USE IN LITHIUM-ION BATTERY

(71) Applicants: SANYO CHEMICAL INDUSTRIES, LTD., Kyoto (JP); NISSAN MOTOR CO., LTD., Kanagawa (JP)

(72) Inventors: Yusuke Mizuno, Kyoto (JP); Takahiro Imaishi, Kyoto (JP); Kenichi Kawakita, Kyoto (JP); Yuki Kusachi, Kanagawa (JP); Hiroshi Akama, Kanagawa (JP); Hideaki Horie, Kanagawa (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 309 days.

(21) Appl. No.: 15/120,585

(22) PCT Filed: Feb. 16, 2015

(86) PCT No.: PCT/JP2015/054065
§ 371 (c)(1),
(2) Date: Aug. 22, 2016

(87) PCT Pub. No.: WO2015/137041
PCT Pub. Date: Sep. 17, 2015

(65) Prior Publication Data
US 2017/0012283 A1 Jan. 12, 2017

(30) Foreign Application Priority Data

Mar. 12, 2014 (JP) .............................. JP2014-049137

(51) Int. Cl.
*H01M 4/36* (2006.01)
*H01M 4/62* (2006.01)
(Continued)

(52) U.S. Cl.
CPC ......... *H01M 4/366* (2013.01); *H01M 4/0404* (2013.01); *H01M 4/0459* (2013.01);
(Continued)

(58) Field of Classification Search
CPC .... H01M 4/366; H01M 4/628; H01M 4/0459; H01M 4/0404; H01M 4/622;
(Continued)

(56) References Cited

U.S. PATENT DOCUMENTS

2005/0241137 A1\* 11/2005 Suzuki ................... H01G 9/042
29/592.1
2009/0087748 A1 4/2009 Choi et al.
(Continued)

FOREIGN PATENT DOCUMENTS

| CN | 101404330 | 4/2009 |
| CN | 102214823 | 10/2011 |

(Continued)

OTHER PUBLICATIONS

International Search Report dated May 19, 2015 in International (PCT) Application No. PCT/JP2015/054065.
(Continued)

*Primary Examiner* — Eugenia Wang
(74) *Attorney, Agent, or Firm* — Wenderoth, Lind & Ponack, L.L.P.

(57) ABSTRACT

An object of the present invention is to provide a negative electrode active material capable of reducing the irreversible
(Continued)

capacity of a lithium ion battery. The present invention provides a coated negative electrode active material for lithium ion batteries wherein at least a portion of the surface of a particulate negative electrode active material for lithium ion batteries is coated with a coating agent and the coated negative electrode active material is doped with at least one of lithium and lithium ions.

10 Claims, 2 Drawing Sheets

(51) Int. Cl.
  *H01M 4/13* (2010.01)
  *H01M 4/583* (2010.01)
  *H01M 4/133* (2010.01)
  *H01M 10/0525* (2010.01)
  *H01M 4/04* (2006.01)
  *H01M 4/139* (2010.01)
  *H01M 10/052* (2010.01)
  *H01M 10/058* (2010.01)
  *H01M 4/02* (2006.01)

(52) U.S. Cl.
  CPC ............ *H01M 4/13* (2013.01); *H01M 4/133* (2013.01); *H01M 4/139* (2013.01); *H01M 4/583* (2013.01); *H01M 4/622* (2013.01); *H01M 4/628* (2013.01); *H01M 10/0525* (2013.01); *H01M 10/052* (2013.01); *H01M 10/058* (2013.01); *H01M 2004/027* (2013.01)

(58) Field of Classification Search
  CPC .... H01M 4/139; H01M 4/13; H01M 10/0525; H01M 10/058; H01M 10/052; H01M 4004/027; Y02P 70/54
  See application file for complete search history.

(56) References Cited

U.S. PATENT DOCUMENTS

| | | | | |
|---|---|---|---|---|
| 2009/0197168 | A1* | 8/2009 | Nishida | H01G 11/32 429/199 |
| 2009/0297945 | A1 | 12/2009 | Hwang et al. | |
| 2011/0129729 | A1* | 6/2011 | Kim | H01M 4/62 429/209 |
| 2011/0206974 | A1* | 8/2011 | Inoue | H01M 4/043 429/149 |
| 2011/0239446 | A1* | 10/2011 | Morishima | H01M 4/0404 29/623.5 |
| 2011/0244322 | A1* | 10/2011 | Hong | H01M 4/364 429/211 |
| 2012/0070736 | A1 | 3/2012 | Ohara et al. | |
| 2012/0202112 | A1* | 8/2012 | Yushin | H01M 10/0525 429/200 |
| 2012/0328949 | A1* | 12/2012 | Yamaguchi | H01M 2/1686 429/224 |
| 2013/0330622 | A1* | 12/2013 | Sasaki | H01M 4/622 429/217 |
| 2013/0337315 | A1 | 12/2013 | Yamamoto et al. | |
| 2014/0065488 | A1 | 3/2014 | Lee et al. | |
| 2015/0115206 | A1 | 4/2015 | Fujii et al. | |
| 2016/0006034 | A1 | 1/2016 | Tanaka et al. | |
| 2016/0028087 | A1* | 1/2016 | Sonobe | H01M 4/622 429/217 |
| 2017/0005331 | A1* | 1/2017 | Kurihara | H01M 4/134 |

FOREIGN PATENT DOCUMENTS

| | | | |
|---|---|---|---|
| CN | 102449813 | 5/2012 | |
| CN | 102569772 | 7/2012 | |
| CN | 103187591 | 7/2013 | |
| CN | 103258992 | 8/2013 | |
| CN | 103682258 | 3/2014 | |
| EP | 3 104 445 | 12/2016 | |
| JP | 8-102333 | 4/1996 | |
| JP | 11-7942 | 1/1999 | |
| JP | 2002-373643 | 12/2002 | |
| JP | 2003-151543 | 5/2003 | |
| JP | 2006-49288 | 2/2006 | |
| JP | 2011-40406 | 2/2011 | |
| JP | 2011-222153 | 11/2011 | |
| JP | 2011-243558 | 12/2011 | |
| JP | 2012-178269 | 9/2012 | |
| JP | 2013-12336 | 1/2013 | |
| JP | 2013-131324 | 7/2013 | |
| JP | 2014-112539 | 6/2014 | |
| JP | 2014-220216 | 11/2014 | |
| JP | 2014-229583 | 12/2014 | |
| KR | 10-2009-0034121 | 4/2009 | |
| KR | 10-2014-0029157 | 3/2014 | |
| WO | WO-2012115096 A1 * | 8/2012 | ............ H01M 4/623 |
| WO | 2013/168727 | 11/2013 | |
| WO | 2014/156892 | 10/2014 | |

OTHER PUBLICATIONS

International Preliminary Report on Patentability dated Sep. 15, 2016 in International (PCT) Application No. PCT/JP2015/054065.
Hassoun et al., "A contribution to the progress of high energy batteries: A metal-free, lithium-ion, silicon-sulfur battery", Journal of Power Sources, vol. 202, 2012, pp. 308-313.
Park, Jung-Ki, "The principles and application of the lithium secondary battery", pp. 122-123 & 432-433 (2010), with English language translation.

* cited by examiner (a)

(b)

(a)

(b)

(c)

COATED NEGATIVE-ELECTRODE ACTIVE MATERIAL FOR USE IN LITHIUM-ION BATTERY, SLURRY FOR USE IN LITHIUM-ION BATTERY, NEGATIVE ELECTRODE FOR USE IN LITHIUM-ION BATTERY, LITHIUM-ION BATTERY, AND METHOD FOR MANUFACTURING COATED NEGATIVE-ELECTRODE ACTIVE MATERIAL FOR USE IN LITHIUM-ION BATTERY

TECHNICAL FIELD

The present invention relates to a coated negative electrode active material for lithium ion batteries, a slurry for lithium ion batteries, a negative electrode for lithium ion batteries, a lithium ion battery, and a method for producing a coated negative electrode active material for lithium ion batteries.

BACKGROUND ART

Reduction in carbon dioxide emissions has been strongly desired in recent years for environmental protection. In the automotive industry, introduction of electric vehicles (EVs) and hybrid electric vehicles (HEVs) has been expected to reduce carbon dioxide emissions, and secondary batteries for driving motors, which are key devices in putting EVs and HEVs into practical use, are being actively developed. As the secondary batteries for driving motors, lithium ion secondary batteries having high energy density and high output power density are attracting attention.

A typical lithium ion secondary battery includes an electrode composed of a positive electrode current collector with a positive electrode active material applied thereto with a binder and an electrode composed of a negative electrode current collector with a negative electrode active material applied thereto with a binder. In the case of a bipolar battery, it includes a bipolar electrode composed of a current collector having, on one side, a positive electrode layer formed by applying a positive electrode active material with a binder, and on the other side, a negative electrode layer formed by applying a negative electrode active material with a binder.

During charging of lithium ion secondary batteries, lithium ions are extracted from the positive electrode active material and are occluded in the negative electrode active material. In contrast, during discharging, lithium ions are released from the negative electrode active material and move to the positive electrode active material, and during this time, a certain amount of electricity (electric energy) can be extracted.

Unfortunately, the irreversible capacity is high in many lithium ion secondary batteries during the first charging and discharging. The term "irreversible capacity" as used herein refers to the difference between the charge capacity (the amount of electricity required for charging) and the discharge capacity (the amount of electricity required for discharging). In other words, a high irreversible capacity indicates inability to discharge electricity in an amount commensurate to the amount charged. The following two factors are considered to be the main causes of the problem of irreversible capacity: the presence of lithium ions that are occluded in the negative electrode during the first charging but are not released during the first discharging; and the amount of electricity used when an electrolyte solution is decomposed during the first charging.

In order to solve the problem of irreversible capacity, Patent Literature 1 discloses a method for stably and efficiently producing an electrode carbon material having a low irreversible capacity. In addition, Patent Literature 2 discloses a technique in which a secondary battery that has been assembled is charged for the first time (pre-charging) to a higher cut off voltage than a cutoff voltage during the second and subsequent charging so as to compensate the irreversible capacity. Further, Patent Literature 3 discloses a technique relating to a secondary battery in which lithium metal or a lithium alloy is arranged to be electrically connected to a negative electrode in a non-contact state.

CITATION LIST

Patent Literature

Patent Literature 1: JP 2011-40406 A
Patent Literature 2: JP 2013-12336 A
Patent Literature 3: JP H08-102333 A

SUMMARY OF INVENTION

Technical Problem

The inventions disclosed in Patent Literatures 1 to 3 can reduce the irreversible capacity of a secondary battery to some degree, but there is a high demand to further reduce the irreversible capacity. In addition, when a secondary battery is pre-charged after the secondary battery is assembled as in the invention disclosed in Patent Literature 2, an electrolyte solution is decomposed during pre-charging, which generates a gas. Thus, the production process of secondary batteries requires a degassing step to vent the gas, which interferes with simplification of the production process of secondary batteries.

The present invention is achieved in view of the above situation, and aims to provide a negative electrode active material capable of reducing the irreversible capacity of lithium ion batteries. The present invention also aims to provide a method for producing the negative electrode active material, a slurry for lithium ion batteries wherein the slurry contains the negative electrode active material, a negative electrode for lithium ion batteries wherein the negative electrode includes the negative electrode active material, and a lithium ion battery including the negative electrode for lithium ion batteries.

Solution to Problem

As a result of intensive studies to solve the above problem, the present inventors reached the following findings: if at least a portion of the surface of a negative electrode active material is coated with a coating agent prior to assembly of a lithium ion battery, and if such a coated negative electrode active material is further doped with lithium or the like, it is possible to reduce the irreversible capacity of the lithium ion battery, and the degassing step is not required in the production of the lithium ion battery. The present invention was accomplished based on these findings.

In other words, the present invention provides a coated negative electrode active material for lithium ion batteries, wherein at least a portion of the surface of a particulate negative electrode active material for lithium ion batteries is coated with a coating agent and the coated negative electrode active material is doped with at least one of lithium and lithium ions.

A slurry for lithium ion batteries of the present invention contains the coated negative electrode active material for lithium ion batteries of the present invention and a dispersion medium.

A negative electrode for lithium ion batteries of the present invention includes the coated negative electrode active material for lithium ion batteries of the present invention, or the negative electrode active material for lithium ion batteries contained in the slurry for lithium ion batteries of the present invention.

A lithium ion battery of the present invention includes the negative electrode for lithium ion batteries of the present invention.

A lithium ion secondary battery of the present invention includes the negative electrode for lithium ion batteries of the present invention, wherein the irreversible capacity is 0.1 to 50 mAh/g.

A method for producing a coated negative electrode active material for lithium ion batteries of the present invention includes the steps of preparing a coated negative electrode active material in which at least a portion of the surface of a particulate negative electrode active material for lithium ion batteries is coated with a coating agent; mixing the coated negative electrode active material with a dispersion medium to obtain a raw material slurry; and doping the coated negative electrode active material in the raw material slurry with at least one of lithium and lithium ions.

Advantageous Effects of Invention

The coated negative electrode active material for lithium ion batteries of the present invention is doped with at least one of lithium and lithium ions. In other words, lithium ions are preliminarily occluded in the coated negative electrode active material prior to assembly of a lithium ion battery. Thus, in the case where a lithium ion battery is assembled using a negative electrode containing the coated negative electrode active material and is charged and discharged for the first time, although some lithium ions are still not released from the negative electrode during discharging, the burden on the positive electrode active material to compensate these lithium ions is small. Therefore, the amount of electricity used for the first charging can be used for discharging, which thus can reduce the irreversible capacity. In addition, the positive electrode active material that supplies lithium ions to be occluded during charging is usually expensive. According to the present invention, it is also possible to reduce the amount of the positive electrode active material to be used. Further, when a lithium ion battery is produced using the coated negative electrode active material in which lithium ions are preliminarily occluded, the production does not involve decomposition of an electrolyte solution to generate a gas during the first charging. Thus, the production of secondary batteries does not require the degassing step. In addition, use of the coated negative electrode active material for lithium ion batteries can suppress the formation of a non-conductive SEI on the surface of the active material and improve the charge-discharge rate.

DESCRIPTION OF EMBODIMENTS

Figure 1:
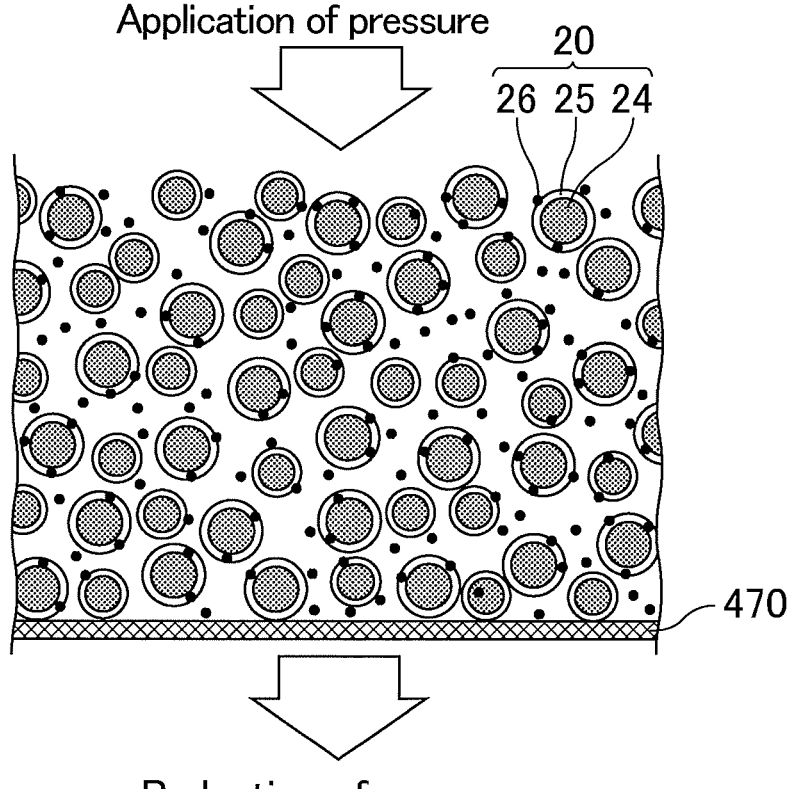
FIG. 1 (a) and FIG. 1 (b) are schematic views of a step of fixing a coated negative electrode active material on a membrane.
Figure 1:
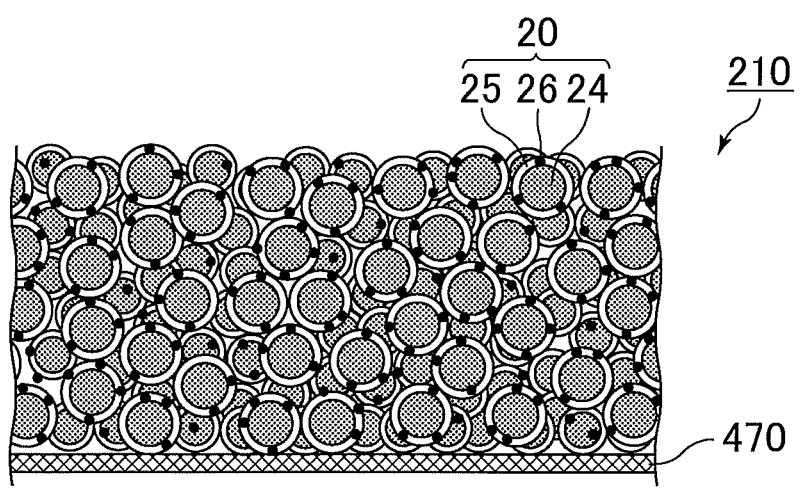

The present invention is described in detail below.

The term "lithium ion battery" as used herein is a concept that includes lithium ion secondary batteries.

[Coated Negative Electrode Active Material for Lithium Ion Batteries]

The present invention provides a coated negative electrode active material for lithium ion batteries wherein at least a portion of the surface of a particulate negative electrode active material for lithium ion batteries is coated with a coating agent and the coated negative electrode active material is doped with at least one of lithium and lithium ions.

The first feature of the coated negative electrode active material for lithium ion batteries of the present invention is that at least a portion of the surface of a particulate negative electrode active material for lithium ion batteries is coated with a coating agent.

The second feature of the coated negative electrode active material for lithium ion batteries of the present invention is that the coated negative electrode active material is doped with at least one of lithium and lithium ions.

Specifically, the coated negative electrode active material is electrochemically doped with at least one of lithium and lithium ions.

The at least one of lithium and lithium ions is preferably doped from at least one of lithium metal or a positive electrode active material, and is more preferably doped from lithium metal.

For example, the coated negative electrode active material can be doped with at least one of lithium and lithium ions as follows: before producing a lithium ion battery as a finished product, a battery for pre-charging is produced using a negative electrode containing the coated negative electrode active material and a lithium metal electrode, and the battery for pre-charging is pre-charged. Alternatively, the coated negative electrode active material can also be doped with at least one of lithium and lithium ions as follows: before producing a lithium ion battery as a finished product, a battery for pre-charging is produced using a negative electrode containing the coated negative electrode active material and a positive electrode containing a positive electrode active material, and the battery for pre-charging is pre-charged.

In addition, while the coated negative electrode active material for lithium ion batteries of the present invention is doped with at least one of lithium and lithium ions, it is preferred that at least the active material is doped with one of lithium or lithium ions.

Examples of the negative electrode active material for lithium ion batteries include graphite; non-graphitizable carbon; amorphous carbon; products obtained by firing high molecular weight compounds (e.g., carbonated resins (such as phenol resin and furan resin) obtained by firing); cokes (e.g., pitch coke, needle coke, and petroleum coke); carbon fibers; conductive polymers (e.g., polyacetylene and polypyrrole); tin, silicon, and metal alloys (e.g., lithium-tin alloy, lithium-silicon alloy, lithium-aluminum alloy, and lithium-aluminum-manganese alloy); and composite oxides of lithium and a transition metal (e.g., $Li_4Ti_5O_{12}$).

The volume average particle size of the negative electrode active material for lithium ion batteries is preferably 0.01 to 100 μm, more preferably 0.1 to 20 μm, still more preferably 2 to 10 μm, in terms of electrical characteristics of the battery.

As used herein, the term "volume average particle size" of the negative electrode active material for lithium ion batteries refers to the volume median diameter (Dv 50) of particles in a particle size distribution determined by the Microtrac method (laser diffraction and scattering method). The Microtrac method determines a particle size distribution by using light scattered from the particles irradiated with laser light. The volume average particle size can be measured using a device such as Microtrac (Nikkiso Co., Ltd.).

The coating agent preferably contains a coating resin, and more preferably contains a coating resin and a conductive additive. If the negative electrode active material for lithium ion batteries is coated with a coating agent containing a coating resin, it is possible to alleviate the volume change of the electrode and thus suppress expansion of the electrode.

The coating resin in the coating agent may be a thermoplastic resin or a thermosetting resin, and examples include vinyl resin, urethane resin, polyester resin, polyamide resin, epoxy resin, polyimide resin, silicone resin, phenol resin, melamine resin, urea resin, aniline resin, ionomer resin, polycarbonate, polysaccharide (e.g., sodium alginate), and mixtures thereof.

Preferred among these is a coating resin having a liquid absorption rate of 10% or more when immersed in an electrolyte solution and having a tensile strength at break of 10% or more when saturated with the electrolyte solution.

The liquid absorption rate of the coating resin when immersed in an electrolyte solution can be determined by measuring the weight of the coating resin before and after immersion in the electrolyte solution and using the following formula.

Liquid absorption rate (%)=[(<Weight of coating resin after immersion in electrolyte solution>–<Weight of coating resin before immersion in electrolyte solution>)/Weight of coating resin before immersion in electrolyte solution]×100

The electrolyte solution to be used to determine the liquid absorption rate is an electrolyte solution in which $LiPF_6$ as an electrolyte is dissolved to a concentration of 1 mol/L in a mixed solvent in which ethylene carbonate (EC) and diethyl carbonate (DEC) are mixed in a volume ratio (EC: DEC) of 3:7.

To determine the liquid absorption rate, the coating resin is immersed in the electrolyte solution at 50° C. for 3 days. The coating resin will be saturated with the electrolyte solution after being immersed in the electrolyte solution at 50° C. for 3 days. The term "saturated with the electrolyte solution" refers to the state where the weight of the coating resin does not increase anymore even if the coating resin is immersed in the electrolyte solution for a longer time.

The electrolyte solution to be used for the production of the lithium ion battery is not limited to the electrolyte solution mentioned above. Any other electrolyte solution may be used.

If the liquid absorption rate is 10% or more, the electrolyte solution is sufficiently absorbed in the coating resin, and lithium ions can easily pass through the coating resin, so that the movement of lithium ions between the active material and the electrolyte solution is not hindered. If the liquid absorption rate is less than 10%, the conductivity of lithium ions will decrease because the electrolyte solution cannot easily permeate into the coating resin, which may result in poor performance of the lithium ion battery.

The liquid absorption rate is preferably 20% or more, more preferably 30% or more.

The upper limit of the liquid absorption rate is preferably 400%, more preferably 300%.

The conductivity of lithium ions in the coating resin can be determined by measuring the conductivity of the coating resin at room temperature after the coating resin is saturated with the electrolyte solution by an alternating current impedance method.

The conductivity of lithium ions determined by the above method is preferably 1.0 to 10.0 mS/cm. With the conductivity in this range, the lithium ion battery can exhibit sufficient performance.

The tensile strength at break of the coating resin when saturated with the electrolyte solution can be measured as follows: the coating resin is punched into a dumbbell shape; the dumbbell-shaped coating resin is immersed in an electrolyte solution at 50° C. for 3 days in the same manner as in the measurement of the liquid absorption rate so as to be saturated with the electrolyte solution; and the tensile strength at break is measured according to ASTM D683 (specimen's shape: Type II). The tensile strength at break is the rate of elongation until the specimen breaks in a tensile test as calculated by the following formula:

Tensile strength at break (%)=[((Specimen's length at break)–(Specimen's length before test))/Specimen's length before test]×100.

The coating resin having a tensile strength at break of 10% or more when saturated with the electrolyte solution has adequate flexibility. Thus, if the negative electrode active material for lithium ion batteries is coated with such a coating agent, it is possible to alleviate the volume change of the electrode and suppress expansion of the electrode.

The tensile strength at break is preferably 20% or more, more preferably 30% or more.

The upper limit of the tensile strength at break is preferably 400%, more preferably 300%.

The coating resin is preferably a vinyl resin (A) having a liquid absorption rate of 10% or more when immersed in an electrolyte solution and having a tensile strength at break of 10% or more when saturated with the electrolyte solution.

The vinyl resin (A) is a resin that contains a polymer (A1) containing a vinyl monomer (a) as an essential constituent monomer.

In particular, the vinyl monomer (a) to be contained in the polymer (A1) preferably includes a vinyl monomer (a1) having a carboxyl group or an acid anhydride group, and a vinyl monomer (a2) represented by the following formula (1):

$$CH_2=C(R^1)COOR^2 \qquad (1)$$

wherein in the formula (1), $R^1$ is a hydrogen atom or a methyl group; and $R^2$ is a branched alkyl group having a carbon number of 4 to 36.

Examples of the vinyl monomer (a1) having a carboxyl group or an acid anhydride group include monocarboxylic acids having a carbon number of 3 to 15 such as (meth)acrylic acid, crotonic acid, and cinnamic acid; dicarboxylic acids having a carbon number of 4 to 24 such as maleic acid and maleic anhydride, fumaric acid, itaconic acid and itaconic anhydride, citraconic acid, and mesaconic acid; and trivalent, tetravalent, or higher polycarboxylic acids having a carbon number of 6 to 24 such as aconitic acid. Preferred among these is (meth)acrylic acid, with methacrylic acid being more preferred.

In the vinyl monomer (a2) represented by the formula (1), $R^1$ is a hydrogen atom or a methyl group. $R^1$ is preferably a methyl group.

$R^2$ is a branched alkyl group having a carbon number of 4 to 36. Specific examples of $R^2$ include 1-alkylalkyl groups [such as 1-methylpropyl (sec-butyl), 1,1-dimethylethyl (tert-butyl), 1-methylbutyl, 1-ethylpropyl, 1,1-dimethylpropyl, 1-methylpentyl, 1-ethylbutyl, 1-methylhexyl, 1-ethylpentyl, 1-methylheptyl, 1-ethylhexyl, 1-methyloctyl, 1-ethylheptyl, 1-methylnonyl, 1-ethyloctyl, 1-methyldecyl, 1-ethylnonyl, 1-butyleicosyl, 1-hexyloctadecyl, 1-octylhexadecyl, 1-decyltetradecyl, and 1-undecyltridecyl groups]; 2-alkylalkyl groups [such as 2-methylpropyl (iso-butyl), 2-methylbutyl, 2-ethylpropyl, 2,2-dimethylpropyl, 2-methylpentyl, 2-ethylbutyl, 2-methylhexyl, 2-ethylpentyl, 2-methylheptyl, 2-ethylhexyl, 2-methyloctyl, 2-ethylheptyl, 2-methylnonyl, 2-ethyloctyl, 2-methyldecyl, 2-ethylnonyl, 2-hexyloctadecyl, 2-octylhexadecyl, 2-decyltetradecyl, 2-undecyltridecyl, 2-dodecylhexadecyl, 2-tridecylpentadecyl, 2-decyloctadecyl, 2-tetradecyloctadecyl, 2-hexadecyloctadecyl, 2-tetradecyleicosyl, and 2-hexadecyleicosyl groups]; 3 to 34-alkylalkyl groups (such as 3-alkylalkyl, 4-alkylalkyl, 5-alkylalkyl, 32-alkylalkyl, 33-alkylalkyl, and 34-alkylalkyl groups); mixed alkyl groups containing one or more branched alkyl groups such as residues obtained by removing hydroxyl groups from oxo alcohols produced from propylene oligomers (from heptamer to undecamer), ethylene/propylene (molar ratio of 16/1 to 1/11) oligomers, isobutylene oligomers (from heptamer to octamer), and α-olefin (having a carbon number of 5 to 20) oligomer (from tetramer to octamer).

Preferred among these are 2-alkylalkyl groups, with a 2-ethylhexyl group and a 2-decyltetradecyl group being more preferred.

In addition to the vinyl monomer (a1) having a carboxyl group or an acid anhydride group and the vinyl monomer (a2) represented by the formula (1), the monomers constituting the polymer (A1) may also include a copolymerizable vinyl monomer (a3) free of active hydrogen.

Examples of the copolymerizable vinyl monomer (a3) free of active hydrogen include the following monomers (a31) to (a38).

(a31) Hydrocarbyl (Meth)Acrylates Formed from Monool Having a Carbon Number of 1 to 20 and (Meth)Acrylic Acid Examples of the monool include (i) aliphatic monools (such as methanol, ethanol, n- or i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, and stearyl alcohol); (ii) alicyclic monools (such as cyclohexyl alcohol); (iii) araliphatic monools (such as benzyl alcohol); and mixtures of two or more thereof.

(a32) Poly(n=2 to 30)Oxyalkylene (Having a Carbon Number of 2 to 4) Alkyl (Having a Carbon Number of 1 to 18) Ether (Meth)Acrylates [Such as (Meth)Acrylate of Ethylene Oxide (Hereinafter, Abbreviated to "EO") (10 mol) Adduct of Methanol, and (Meth)Acrylate of Propylene Oxide (Hereinafter, Abbreviated to "PO") (10 mol) Adduct of Methanol]

(a33) Nitrogen-Containing Vinyl Compounds (a33-1) Amide Group-Containing Vinyl Compounds (i) (Meth)acrylamide compounds having a carbon number of 3 to 30, e.g., N,N-dialkyl (having a carbon number of 1 to 6) or diaralkyl (having a carbon number of 7 to 15) (meth)acrylamides (such as N,N-dimethylacrylamide and N,N-dibenzylacrylamide), and diacetone acrylamide (ii) Amide group-containing vinyl compounds having a carbon number of 4 to 20 excluding the (meth)acrylamide compounds, e.g., N-methyl-N-vinylacetamide and cyclic amides (such as pyrrolidone compounds (having a carbon number of 6 to 13, e.g., N-vinylpyrrolidone)).

(a33-2) (Meth)Acrylate Compounds (i) Dialkyl (having a carbon number of 1 to 4) aminoalkyl (having a carbon number of 1 to 4) (meth)acrylates [such as N,N-dimethylaminoethyl (meth)acrylate, N,N-diethylaminoethyl(meth)acrylate, t-butylaminoethyl(meth)acrylate, and morpholinoethyl(meth)acrylate]

(ii) Quaternary ammonium group-containing (meth)acrylates {quaternary compounds obtained by quaternizing tertiary amino group-containing (meth)acrylates [such as N,N-dimethylaminoethyl (meth)acrylate and N,N-diethylaminoethyl (meth)acrylate] with a quaternizing agent (such as methylchloride, dimethyl sulfate, benzyl chloride, or dimethyl carbonate)}

(a33-3) Heterocyclic Ring-Containing Vinyl Compounds

Pyridine compounds (having a carbon number of 7 to 14, e.g., 2- or 4-vinylpyridine), imidazole compounds (having a carbon number of 5 to 12, e.g., N-vinyl imidazole), pyrrole compounds (having a carbon number of 6 to 13, e.g., N-vinyl pyrrole), and pyrrolidone compounds (having a carbon number of 6 to 13, e.g., N-vinyl-2-pyrrolidone)

(a33-4) Nitrile Group-Containing Vinyl Compounds

Nitrile group-containing vinyl compounds having a carbon number of 3 to 15, e.g., (meth)acrylonitrile, cyanostyrene, and cyanoalkyl (having a carbon number of 1 to 4) acrylate (a33-5) Other Nitrogen-Containing Vinyl Compounds Nitro group-containing vinyl compounds (having a carbon number of 8 to 16, e.g., nitrostyrene)

(a34) Vinyl Hydrocarbons (a34-1) Aliphatic Vinyl Hydrocarbons

Olefins having a carbon number of 2 to 18 or more (such as ethylene, propylene, butene, isobutylene, pentene, heptene, diisobutylene, octene, dodecene, and octadecene), dienes having a carbon number of 4 to 10 or more (such as butadiene, isoprene, 1,4-pentadiene, 1,5-hexadiene, and 1,7-octadiene)

(a34-2) Alicyclic Vinyl Hydrocarbons

Cyclic unsaturated compounds having a carbon number of 4 to 18 or more, e.g., cycloalkene (e.g., cyclohexene), (di)cycloalkadiene (e.g., (di)cyclopentadiene), terpene (e.g., pinene and limonene), and indene (a34-3) Aromatic Vinyl Hydrocarbons Aromatic unsaturated compounds having a carbon number of 8 to 20 or more, e.g., styrene, α-methylstyrene, vinyl toluene, 2,4-dimethylstyrene, ethylstyrene, isopropylstyrene, butylstyrene, phenylstyrene, cyclohexylstyrene, and benzylstyrene (a35) Vinyl Esters Aliphatic vinyl esters [having a carbon number of 4 to 15, e.g., alkenyl esters of aliphatic carboxylic acid (mono- or dicarboxylic acid) (e.g., vinyl acetate, vinyl propionate, vinyl butyrate, diallyl adipate, isopropenyl acetate, and vinyl methoxy acetate)]

Aromatic vinyl esters [having a carbon number of 9 to 20, e.g., alkenyl esters of aromatic carboxylic acid (mono- or dicarboxylic acid) (e.g., vinyl benzoate, diallyl phthalate, methyl-4-vinyl benzoate), and aromatic ring-containing esters of aliphatic carboxylic acid (e.g., acetoxystyrene)]

(a36) Vinyl Ether

Aliphatic vinyl ethers [having a carbon number of 3 to 15, e.g., vinyl alkyl (having a carbon number of 1 to 10) ether (such as vinyl methyl ether, vinyl butyl ether, and vinyl 2-ethylhexyl ether), vinyl alkoxy (having a carbon number of 1 to 6) alkyl (having a carbon number of 1 to 4) ethers (such as vinyl-2-methoxyethyl ether, methoxybutadiene, 3,4-dihydro-1,2-pyran, 2-butoxy-2'-vinyloxy diethyl ether, and vinyl-2-ethylmercapto ethyl ether), and poly(2 to 4) (meth)allyloxyalkane (having a carbon number of 2 to 6) (such as diallyloxyethane, triallyloxyethane, tetraallyloxybutane, and tetramethallyloxyethane)]

Aromatic vinyl ethers (having a carbon number of 8 to 20, e.g., vinyl phenyl ether and phenoxystyrene)

(a37) Vinyl Ketones

Aliphatic vinyl ketones (having a carbon number of 4 to 25, e.g., vinyl methyl ketone and vinyl ethyl ketone)

Aromatic vinyl ketones (having a carbon number of 9 to 21, e.g., vinyl phenyl ketone)

(a38) Unsaturated Dicarboxylic Acid Diesters

Unsaturated dicarboxylic acid diesters having a carbon number of 4 to 34, e.g., dialkyl fumarate (two alkyl groups are each a linear, branched, or alicyclic group having a carbon number of 1 to 22) and dialkyl maleate (two alkyl groups are each a linear, branched, or alicyclic group having a carbon number of 1 to 22)

Preferred among the above examples of the monomer (a3) in terms of withstand voltage are the monomers (a31), (a32), and (a33), with methyl (meth)acrylate, ethyl (meth)acrylate, and butyl (meth)acrylate among the monomers (a31) being more preferred.

The polymer (A1) preferably contains 0.1 to 80% by weight of the vinyl monomer (a1) having a carboxyl group or an acid anhydride group, 0.1 to 99.9% by weight of the vinyl monomer (a2) represented by the above formula (1), and 0 to 99.8% by weight of the copolymerizable vinyl monomer (a3) free of active hydrogen, based on the weight of the polymer (A1).

If the amounts of these monomers are in the above ranges, the electrolyte solution can be successfully absorbed.

More preferred amounts are 15 to 60% by weight for (a1), 5 to 60% by weight for (a2), and 5 to 80% by weight for (a3); and still more preferred amounts are 25 to 50% by weight for (a1), 15 to 45% by weight for (a2), and 20 to 60% by weight for (a3).

The lower limit of the number average molecular weight of the polymer (A1) is preferably 3,000, more preferably 50,000, still more preferably 100,000, particularly preferably 200,000. The upper limit thereof is preferably 2,000,000, more preferably 1,500,000, still more preferably 1,000,000, particularly preferably 800,000.

The number average molecular weight of the polymer (A1) can be measured by gel permeation chromatography (hereinafter, abbreviated to "GPC") under the following conditions.
Device: Alliance GPC V2000 (Nihon Waters K.K.)
Solvent: ortho-dichlorobenzene
Standard substance: polystyrene
Detector: RI
Sample concentration: 3 mg/ml
Column solid phase: two PLgel 10 μm MIXED-B columns connected in series (Polymer Laboratories Limited)
Column temperature: 135° C.

The solubility parameter (hereinafter, abbreviated to "SP value") of the polymer (A1) is preferably 9.0 to 20.0 $(cal/cm^3)^{1/2}$. The SP value of the polymer (A1) is more preferably 10.0 to 18.0 $(cal/cm^3)^{1/2}$, still more preferably 11.5 to 14.0 $(cal/cm^3)^{1/2}$. The polymer (A1) having an SP value of 9.0 to 20.0 $(cal/cm^3)^{1/2}$ is preferred in terms of absorption of the electrolyte solution.

The SP value can be calculated by the Fedors method. The SP value can be expressed by the following equation:

$$SP\ value(\delta) = (\Delta H/V)^{1/2}$$

wherein ΔH represents the molar evaporation heat (cal), and V represents the molar volume ($cm^3$).

In addition, the total molar evaporation heat (ΔH) and the total molar volume (V) of the atomic groups described in "POLYMER ENGINEERING AND SCIENCE, 1974, Vol. 14, No. 2, ROBERT F. FEDORS. (pp. 151-153)" can be used for ΔH and V, respectively.

The SP value is an index of miscibility. Those having similar SP values are easily mixed together (highly miscible), and those having very different SP values are not easily mixed together.

The glass transition point [hereinafter, abbreviated to "Tg"; measurement method: differential scanning calorimetry (DSC)] of the polymer (A1) is preferably 80° C. to 200° C., more preferably 90° C. to 180° C., still more preferably 100° C. to 150° C., in terms of heat resistance of the battery.

The polymer (A1) can be produced by a known polymerization method (such as bulk polymerization, solution polymerization, emulsion polymerization, or suspension polymerization).

Polymerization can be carried out using a known polymerization initiator {e.g., an azo-based initiator [such as 2,2'-azobis(2-methylpropionitrile) or 2,2'-azobis(2,4-dimethylvaleronitrile)], or a peroxide-based initiator (such as benzoyl peroxide, di-t-butylperoxide, or lauryl peroxide)}.

The amount of the polymerization initiator to be used based on the total monomer weight is preferably 0.01 to 5% by weight, more preferably 0.05 to 2% by weight, still more preferably 0.1 to 1.5% by weight.

In the case of solution polymerization, examples of solvents to be used include esters (having a carbon number of 2 to 8, e.g., ethyl acetate and butyl acetate), alcohols (having a carbon number of 1 to 8, e.g., methanol, ethanol, and octanol), hydrocarbons (having a carbon number of 4 to 8, e.g., n-butane, cyclohexane, and toluene), and ketones (having a carbon number of 3 to 9, e.g., methyl ethyl ketone). The amount to be used based on the total monomer weight is usually 5 to 900%, preferably 10 to 400%, more preferably 30 to 300% by weight. The monomer concentration is usually 10 to 95% by weight, preferably 20 to 90% by weight, more preferably 30 to 80% by weight.

In the case of emulsion polymerization and suspension polymerization, examples of dispersion mediums to be used include water, alcohols (e.g., ethanol), esters (e.g., ethyl propionate), and light naphtha; and examples of emulsifiers to be used include metal salts of higher fatty acids (having a carbon number of 10 to 24) (e.g., sodium oleate and sodium stearate), metal salts of sulfates of higher alcohol (having a carbon number of 10 to 24) (e.g., sodium lauryl sulfate), ethoxylated tetramethyl decyne diol, sodium sulfoethyl methacrylate, and dimethylamino methyl methacrylate. Further, a stabilizer such as polyvinyl alcohol or polyvinyl pyrrolidone may be added.

The monomer concentration in the solution or the dispersion is usually 5 to 95% by weight, preferably 10 to 90% by weight, more preferably 15 to 85% by weight. The amount of the polymerization initiator to be used based on the total monomer weight is usually 0.01 to 5% by weight, preferably 0.05 to 2% by weight.

Polymerization can be carried out using a known chain transfer agent. For example, at least one of a mercapto compound (such as dodecyl mercaptan or n-butyl mercaptan) or a halogenated hydrocarbon (such as carbon tetrachloride, carbon tetrabromide, or benzyl chloride) can be used. The amount to be used based on the total monomer weight is usually 2% by weight or less, preferably 0.5% by weight or less, more preferably 0.3% by weight or less.

In addition, the system temperature in the polymerization reaction is usually −5° C. to 150° C., preferably 30° C. to 120° C., more preferably 50° C. to 110° C. The reaction time is usually 0.1 to 50 hours, preferably 2 to 24 hours. The termination of the reaction can be confirmed by the amount of unreacted monomers which is usually 5% by weight or less, preferably 1% by weight or less, more preferably 0.5% by weight or less of the total amount of the monomers used.

The polymer (A1) to be contained in the vinyl resin (A) may be a crosslinked polymer obtained by crosslinking the polymer (A1) with at least one of a polyepoxy compound (a'1) or a polyol compound (a'2).

To obtain a crosslinked polymer, it is preferred to crosslink the polymer (A1) using a crosslinking agent (A') having a reactive functional group that reacts with active hydrogen of a carboxyl group or the like in the polymer (A1), and it is preferred to use at least one of the polyepoxy compound (a'1) or the polyol compound (a'2) as the crosslinking agent (A').

The polyepoxy compound (a'1) has an epoxy equivalent of 80 to 2,500. Examples thereof include glycidyl ethers [such as bisphenol A diglycidyl ether, bisphenol F diglycidyl ether, pyrogallol triglycidyl ether, ethylene glycol diglycidyl ether, propylene glycol diglycidyl ether, neopentyl glycol diglycidyl ether, trimethylolpropane triglycidyl ether, glycerol triglycidyl ether, polyethylene glycol (Mw 200 to 2,000) diglycidyl ether, polypropylene glycol (Mw 200 to 2,000) diglycidyl ether, and diglycidyl ether of bisphenol A alkylene oxide (1 to 20 mol) adduct]; glycidyl esters (such as phthalic acid diglycidyl ester, trimellitic acid triglycidyl ester, dimer acid diglycidyl ester, and adipic acid diglycidyl ester); glycidylamines [such as N,N-diglycidylaniline, N,N-diglycidyltoluidine, N,N,N',N'-tetraglycidyldiaminodiphenylmethane, N,N,N',N'-tetraglycidylxylylenediamine, 1,3-bis(N,N-diglycidylaminomethyl)cyclohexane, and N,N,N',N'-tetraglycidylhexamethylenediamine]; aliphatic epoxides (such as epoxidized polybutadiene and epoxidized soybean oil); and alicyclic epoxides (such as limonene dioxide and dicyclopentadiene dioxide).

Examples of the polyol compound (a'2) include low molecular weight polyhydric alcohols {aliphatic or alicyclic diols having a carbon number of 2 to 20 [such as ethylene glycol (hereinafter, abbreviated to "EG"), diethylene glycol (hereinafter, abbreviated to "DEG"), propylene glycol, 1,3-butylene glycol, 1,4-butanediol (hereinafter, abbreviated to "14BG"), 1,6-hexanediol, 3-methylpentanediol, neopentyl glycol, 1,9-nonanediol, 1,4-dihydroxycyclohexane, 1,4-bis(hydroxymethyl)cyclohexane, and 2,2-bis(4,4'-hydroxycyclohexyl)propane]; aromatic ring-containing diols having a carbon number of 8 to 15 [such as m- or p-xylylene glycol and 1,4-bis(hydroxyethyl)benzene]; triols having a carbon number of 3 to 8 (such as glycerol and trimethylolpropane); tetrahydric or higher polyhydric alcohols [such as pentaerythritol, α-methylglucoside, sorbitol, xylite, mannitol, glucose, fructose, sucrose, dipentaerythritol, and polyglycerol (polymerization degree of 2 to 20)]}, and alkylene (having a carbon number of 2 to 4) oxide adducts (polymerization degree of 2 to 30) thereof.

As for the amount of the crosslinking agent (A') to be used, the equivalent ratio of active hydrogen-containing groups in the polymer (A1) to reactive functional groups in the crosslinking agent (A') is preferably 1:0.01 to 1:2, more preferably 1:0.02 to 1:1, in terms of absorption of the electrolyte solution.

Examples of methods for crosslinking the polymer (A1) using the crosslinking agent (A') include one in which a lithium ion battery active material is coated with a coating resin obtained from the polymer (A1) before crosslinking.

Specifically, a lithium ion battery active material and a resin solution containing the polymer (A1) are mixed together and a solvent is removed from the mixture so as to produce a coated active material in which the lithium ion battery active material is coated with the resin. Then, a solution containing the crosslinking agent (A') is mixed with the coated active material, and the mixture is heated to remove the solvent and initiate a crosslinking reaction. In this manner, the lithium ion battery active material is coated with the crosslinked polymer.

The heating temperature is preferably 70° C. or higher in the case of using the polyepoxy compound (a'1) as a crosslinking agent, and is preferably 120° C. or higher in the case of using the polyol compound (a'2) as a crosslinking agent.

The coating resin is preferably a urethane resin (B) having a liquid absorption rate of 10% or more when immersed in an electrolyte solution and having a tensile strength at break of 10% or more when saturated with the electrolyte solution.

The urethane resin (B) is a resin obtained by reaction of an active hydrogen component (b1) with an isocyanate component (b2).

The active hydrogen component (b1) preferably contains at least one selected from the group consisting of polyether diols, polycarbonate diols, and polyester diols.

Examples of polyether diols include polyoxyethylene glycol (hereinafter, abbreviated to "PEG"), polyoxyethylene-polyoxypropylene block copolymer diol, polyoxyethylene-polyoxytetramethylene block copolymer diol; ethylene oxide adducts of low molecular weight glycols such as ethylene glycol, propylene glycol, 1,4-butanediol, 1,6 hexamethylene glycol, neopentyl glycol, bis(hydroxymethyl) cyclohexane, and 4,4'-bis(2-hydroxyethoxy)-diphenylpropane; condensed polyether-ester diol obtained by reaction of PEG having a number average molecular weight of 2,000 or less with at least one dicarboxylic acid [such as aliphatic dicarboxylic acids having a carbon number of 4 to 10 (e.g., succinic acid, adipic acid, and sebacic acid) and aromatic dicarboxylic acids having a carbon number of 8 to 15 (e.g., terephthalic acid and isophthalic acid)]; and mixtures of two or more thereof.

In the case where polyether diol contains oxyethylene units, the amount of oxyethylene units is preferably 20% by weight or more, more preferably 30% by weight or more, still more preferably 40% by weight or more.

Examples also include polyoxypropylene glycol, polyoxytetramethylene glycol (hereinafter, abbreviated to "PTMG"), and polyoxypropylene-polyoxytetramethylene block copolymer diol.

Preferred among these are PEG, polyoxyethylene-polyoxypropylene block copolymer diol, and polyoxyethylene-polyoxytetramethylene block copolymer diol, with PEG being more preferred.

These polyether diols may be used alone, or a mixture of two or more thereof may be used.

Examples of polycarbonate diols include polyhexamethylene carbonate diol.

Examples of polyester diols include a condensed polyester diol obtained by reaction of at least one of a low molecular weight diol or a polyether diol having a number average molecular weight of 1,000 or less with at least one of the dicarboxylic acids mentioned above; and a polylactone diol obtained by ring-opening polymerization of a lactone having a carbon number of 4 to 12. Examples of the low molecular weight diol include the low molecular weight glycols mentioned above as examples of the polyether diol. Examples of the polyether diol having a number average molecular weight of 1,000 or less include polyoxypropylene glycol and PTMG. Examples of the lactone include ε-caprolactone and γ-valerolactone. Specific examples of the polyester diol include poly(ethylene adipate) diol, poly(butylene adipate)diol, poly(neopentylene adipate)diol, poly(3-methyl-1,5-pentylene adipate)diol, poly(hexamethylene adipate)diol, poly(caprolactone)dial, and mixtures of two or more thereof.

The active hydrogen component (b1) may also be a mixture of two or more selected from the polyether diols, polycarbonate diols, and polyester diols.

Preferably, the active hydrogen component (b1) essentially contains a high molecular weight diol (b11) having a number average molecular weight of 2,500 to 15,000. Examples of the high molecular weight diol (b11) include the polyether diols, polycarbonate diols, and polyester diols.

The high molecular weight diol (b11) having a number average molecular weight of 2,500 to 15,000 is preferred for imparting adequate flexibility to the urethane resin (B) and strength to a coating formed on the active material.

The number average molecular weight of the high molecular weight diol (b11) is more preferably 3,000 to 12,500, still more preferably 4,000 to 10,000.

The number average molecular weight of the high molecular weight diol (b11) can be calculated from the hydroxyl value of the high molecular weight diol.

The hydroxyl value can be measured in accordance with JIS K1557-1.

Preferably, the active hydrogen component (b1) essentially contains the high molecular weight diol (b11) having a number average molecular weight of 2,500 to 15,000, and the solubility parameter (SP value) of the high molecular weight diol (b11) is 8.0 to 12.0 $(cal/cm^3)^{1/2}$. The SP value of the high molecular weight diol (b11) is more preferably 8.5 to 11.5 $(cal/cm^3)^{1/2}$, Still more preferably 9.0 to 11.0 $(cal/cm^3)^{1/2}$ The high molecular weight diol (b11) having an SP value of 8.0 to 12.0 $(cal/cm^3)^{1/2}$ is preferred in terms of absorption of the electrolyte solution by the urethane resin (B).

Preferably, the active hydrogen component (b1) essentially contains the high molecular weight diol (b11) having a number average molecular weight of 2,500 to 15,000, and the amount of the high molecular weight diol (b11) is 20 to 80% by weight based on the weight of the urethane resin (B). The amount of the high molecular weight diol (b11) is more preferably 30 to 70% by weight, still more preferably 40 to 65% by weight.

The high molecular weight diol (b11) in an amount of 20 to 80% by weight is preferred in terms of absorption of the electrolyte solution by the urethane resin (B).

Preferably, the active hydrogen component (b1) essentially contains the high molecular weight diol (b11) having a number average molecular weight of 2,500 to 15,000 and a chain extender (b13).

Examples of the chain extender (b13) include low molecular weight diols having a carbon number of 2 to 10 (e.g., EG, propylene glycol, 14BG, DEG, and 1,6-hexamethylene glycol); diamines [aliphatic diamine having a carbon number of 2 to 6 (e.g., ethylenediamine and 1,2-propylenediamine), alicyclic diamine having a carbon number of 6 to 15 (e.g., isophorone diamine and 4,4'-diaminodicyclohexylmethane), aromatic diamines having a carbon number of 6 to 15 (e.g., 4,4'-diaminodiphenylmethane)]; monoalkanolamines (e.g., monoethanolamine); hydrazine or its derivatives (e.g., adipic acid dihydrazide); and mixtures of two or more thereof. Preferred among these are low molecular weight diols, with EG, DEG, and 14BG being more preferred.

A preferred combination of the high molecular weight diol (b11) and the chain extender (b13) is a combination of PEG as the high molecular weight diol (b11) and EG as the chain extender (b13) or a combination of a polycarbonate diol as the high molecular weight diol (b11) and EG as the chain extender (b13).

Preferably, the active hydrogen component (b1) contains the high molecular weight diol (b11) having a number average molecular weight of 2,500 to 15,000, a diol (b12) other than the high molecular weight diol (b11), and the chain extender (b13); the equivalent ratio of (b11) to (b12) [(b11)/(b12)] is 10/1 to 30/1; and the equivalent ratio of (b11) to the total of (b12) and (b13) {(b11)/[(b12)+(b13)]} is 0.9/1 to 1.1/1.

The equivalent ratio of (b11) to (b12) [(b11)/(b12)] is more preferably 13/1 to 25/1, still more preferably 15/1 to 20/1.

The diol (b12) other than the high molecular weight diol (b11) is not limited as long as it is a diol and it is not one of the examples of the high molecular weight diol (b11) or the low molecular weight diol having a carbon number of 2 to 10 in the chain extender (b13). Specifically, the diol (b12) may be a diol having a number average molecular weight of less than 2,500, or a diol having a number average molecular weight of more than 15,000.

Examples of such diol include the polyether diols, polycarbonate diols, and polyester diols mentioned above.

Isocyanate conventionally used in the production of polyurethane can be used as the isocyanate component (b2). Examples of such isocyanates include aromatic diisocyanates having a carbon number of 6 to 20 (excluding carbon atoms in NCO groups; the same shall apply hereinafter), aliphatic diisocyanates having a carbon number of 2 to 18, alicyclic diisocyanates having a carbon number of 4 to 15, araliphatic diisocyanates having a carbon number of 8 to 15, modified forms of these diisocyanates (such as carbodiimide-modified diisocyanate, urethane-modified diisocyanate, and uretdione-modified diisocyanate), and mixtures of two or more thereof.

Specific examples of the aromatic diisocyanates include 1,3- or 1,4-phenylene diisocyanate, 2,4- or 2,6-tolylene diisocyanate, 2,4'- or 4,4'-diphenylmethane diisocyanate (hereinafter, diphenylmethane diisocyanate is abbreviated to "MDI"), 4,4'-diisocyanato biphenyl, 3,3'-dimethyl-4,4'-diisocyanato biphenyl, 3,3'-dimethyl-4,4'-diisocyanato diphenylmethane, and 1,5-naphthylene diisocyanate.

Specific examples of the aliphatic diisocyanates include ethylene diisocyanate, tetramethylene diisocyanate, hexamethylene diisocyanate, dodecamethylene diisocyanate, 2,2,4-trimethyl hexamethylene diisocyanate, lysine diisocyanate, 2,6-diisocyanato methylcaproate, bis(2-isocyanatoethyl)carbonate, and 2-isocyanatoethyl-2,6-diisocyanato hexanoate.

Specific examples of the alicyclic diisocyanate include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, and 2,5- or 2,6-norbornane diisocyanate.

Specific examples of the aralphatic diisocyanate include m- or p-xylylene diisocyanate and α,α,α',α'-tetramethylxylylene diisocyanate.

Preferred among these are aromatic diisocyanates and alicyclic diisocyanates, with aromatic diisocyanates being more preferred and MDI being still more preferred.

In the case where the urethane resin (B) contains the high molecular weight diol (b11) and the isocyanate component (b2), a preferred equivalent ratio of (b2)/(b11) is 10/1 to 30/1, more preferably 11/1 to 28/1, still more preferably 15/1 to 25/1. If the amount of the isocyanate component (b2) in the ratio is more than 30 equivalents, the resulting coating will be inflexible.

In the case where the urethane resin (B) contains the high molecular weight diol (b11), the chain extender (b13), and the isocyanate component (b2), the equivalent ratio of (b2)/[(b11)+(b13)] is usually 0.9/1 to 1.1/1, preferably 0.95/1 to 1.05/1. If the equivalent ratio is outside the above range, the molecular weight of the urethane resin may not be sufficiently high.

The number average molecular weight of the urethane resin (B) is preferably 40,000 to 500,000, more preferably 50,000 to 400,000, still more preferably 60,000 to 300,000. If the number average molecular weight of the urethane resin (B) is less than 40,000, the resulting coating will have low strength; whereas if the number average molecular weight thereof is more than 500,000, the solution of the urethane resin (B) will have high viscosity, and this may result in a non-uniform coating.

The number average molecular weight of the urethane resin (B) is measured by GPC using dimethylformamide (hereinafter, abbreviated to "DMF") as a solvent and polyoxypropylene glycol as a standard substance. The sample concentration may be 0.25% by weight; the column solid phase may be one in which each of the following columns is connected together: TSKgel SuperH2000, TSKgel SuperH3000, and TSKgel SuperH4000 (all available from Tosoh Corporation); and the column temperature may be 40° C.

The urethane resin (B) can be produced by reaction of the active hydrogen component (b1) with the isocyanate component (b2).

Examples of methods for producing the urethane resin (B) include a one shot method in which the high molecular weight diol (b11) and the chain extender (b13) are used as the active hydrogen components (b1), and the isocyanate component (b2) is simultaneously reacted with the high molecular weight diol (b11) and the chain extender (b13); and a prepolymer method in which the high molecular weight diol (b11) and the isocyanate component (b2) are reacted first, and the chain extender (b13) is subsequently reacted.

In addition, the urethane resin (B) can be produced in the presence or absence of a solvent inactive to an isocyanate group. Examples of suitable solvents to be used in the reaction in the presence of a solvent include amide-based solvents [e.g., DMF, dimethyl acetamide, N-methyl-2-pyrrolidone (hereinafter, abbreviated to "NMP")], sulfoxide-based solvents (e.g., dimethyl sulfoxide), ketone-based solvents (e.g., methyl ethyl ketone and methyl isobutyl ketone), aromatic solvents (e.g., toluene and xylene), ether-based solvents (e.g., dioxane and tetrahydrofuran), ester-based solvents (e.g., ethyl acetate and butyl acetate), and mixtures of two or more thereof. Preferred among these are amide-based solvents, ketone-based solvents, aromatic solvents, and mixtures of two or more thereof.

In the production of the urethane resin (B), the reaction temperature may be a temperature commonly used in a urethanation reaction, and it is usually 20° C. to 100° C. in the presence of a solvent, and is usually 20° C. to 220° C. in the absence of a solvent.

To facilitate the reaction, a catalyst commonly used in a polyurethane reaction [e.g., an amine-based catalyst (such as triethylamine or triethylenediamine) or a tin-based catalyst (such as dibutyltin dilaurate).] may be used as needed.

In addition, a polymerization terminator [e.g., a monohydric alcohol (such as ethanol, isopropanol, or butanol) or a monovalent amine (such as dimethylamine or dibutylamine)] may also be used as needed.

The urethane resin (B) can be produced using a production apparatus commonly used in the relevant industry. In the absence of a solvent, a production apparatus such as a kneader or extruder can be used. The solution viscosity of the thus-produced urethane resin (B) as measured in a 30% by weight (solids) solution in DMF is usually 1 to 1,000,000 mPa·s/20° C., and from a practical standpoint, it is preferably 1,500 to 500,000 mPa·s/20° C., more preferably 5,000 to 100,000 mPa·s/20° C.

In the case where the coating agent contains a conductive additive, the conductive additive is selected from conductive materials.

Specifically, non-limiting examples include metals (e.g., aluminum, stainless steel (SUS), silver, gold, copper, and titanium), carbon (e.g., graphite and carbon black (such as acetylene black, ketjen black, furnace black, channel black, and thermal lamp black)), and mixtures thereof.

These conductive additives may be used alone or in combination of two or more thereof. Alternatively, an alloy or metal oxide thereof may be used. In terms of electrical stability, aluminum, stainless steel, carbon, silver, gold, copper, titanium, and mixtures thereof are preferred, with silver, gold, aluminum, stainless steel, and carbon being more preferred, and carbon being still more preferred. Alternatively, the conductive additive may be a particulate ceramic material or resin material coated with a conductive material (a metal material among the materials of the conductive additives mentioned above) by plating or the like.

The shape (form) of the conductive additive is not limited to the particulate form, and may be different from the particulate form. For example, the conductive additive may be in the form of carbon nanotubes or the like that has been put into practice as the form of a filler type conductive resin composition.

The average particle size of these conductive additives is not particularly limited, but it is preferably 0.01 to 10 μm, more preferably 0.02 to 5 μm, still more preferably 0.03 to 1 μm, in terms of electrical characteristics of the battery. The term "particle size" as used herein refers to the maximum distance L among distances between any two points on the contour of each particle of the conductive additive. To determine the value of the average particle size, the particles are observed using a device such as a scanning electron microscope (SEM) or a transmission electron microscope (TEM), and the average particle size of particles observed in several to several tens of viewing fields is calculated.

The mixing ratio of the coating resin to the conductive additive is not limited, but the weight ratio of the coating resin (weight of the resin solids content) to the conductive additive is preferably 1:0.2-3.0 (coating resin:conductive additive).

The conductivity of the coating agent is preferably 0.001 to 10 mS/cm, more preferably 0.01 to 5 mS/cm.

The conductivity of the coating agent can be measured by the four-terminal method.

If the coating agent has a conductivity of 0.001 mS/cm or more, the electronic resistance to the active material will not be high, and the battery can be charged and discharged.

If the conductivity of the coating agent is 0.001 to 10 mS/cm, it is preferred that the coating agent contains a coating resin and a conductive additive, or a coating agent that has been subjected to a conductive treatment may be used.

Examples of the coating agent that has been subjected to a conductive treatment include a metal membrane.

The metal membrane can be formed by, for example, a method such as a metal plating treatment, a vapor deposition treatment, or a sputtering treatment.

A method for producing the coated negative electrode active material for lithium ion batteries of the present invention is described below.

The method for producing the coated negative electrode active material for lithium ion batteries of the present invention includes the steps of preparing a coated negative electrode active material in which at least a portion of the surface of a particulate negative electrode active material for lithium ion batteries is coated with a coating agent; mixing the coated negative electrode active material with a dispersion medium to obtain a raw material slurry; and doping the coated negative electrode active material in the raw material slurry with at least one of lithium and lithium ions.

(1) First, a coated negative electrode active material in which at least a portion of the surface of a particulate negative electrode active material for lithium ion batteries is coated with a coating agent is prepared.

For example, the coated negative electrode active material can be obtained as follows: particles of a negative electrode active material for lithium ion batteries are fed into a universal mixer; while stirring at 30 to 500 rpm, a resin solution containing a coating resin is added dropwise thereto over 1 to 90 minutes; a conductive additive is further added as needed; the temperature is raised to 50° C. to 200° C. while stirring; the pressure is reduced to 0.007 to 0.04 MPa; and the mixture is kept in that state for 10 to 150 minutes.

Details such as the types of the negative electrode active material for lithium ion batteries and the coating agents (the coating resin and the conductive additive) are as described above for the coated active material for lithium ion batteries of the present invention. Thus, a detailed description thereof is omitted.

(2) Next, the coated negative electrode active material and a dispersion medium are mixed to obtain a raw material slurry. A conductive additive may be added as needed. The conductive additive may be the same as that contained in the coating agent.

At this point, the particulate coated negative electrode active material not doped with at least one of lithium and lithium ions is dispersed in the dispersion medium.

To obtain a raw material slurry, the particulate coated negative electrode active material is dispersed preferably at a concentration of 30 to 90% by weight, more preferably at a concentration of 50 to 80% by weight, based on the weight of the dispersion medium.

The mixing method is not limited. Examples include methods that use a mixer (e.g., a stirring-type, shaking-type, or rotary-type mixer). Examples also include methods that use a disperser/mixer such as a homogenizer, ball mill, sand mill, roll mill, or planetary mixer.

Examples of the dispersion medium to be contained in the raw material slurry include an electrolyte solution and a non-aqueous solvent.

An electrolyte solution is preferred among these. In other words, the raw material slurry is preferably an electrolyte slurry containing the particulate coated negative electrode active material and an electrolyte solution.

The electrolyte solution may be one containing an electrolyte and a non-aqueous solvent, which is used in the production of a lithium ion battery.

The electrolyte to be contained in the electrolyte solution may be one that is used in a general electrolyte solution. Examples include lithium salts of inorganic acids such as $LiPF_6$, $LiBF_4$, $LiSbF_6$, $LiAsF_6$, and $LiClO_4$; and lithium salts of organic acids such as $LiN(CF_3SO_2)_2$, $LiN(C_2F_5SO_2)_2$, and $LiC(CF_3SO_2)_3$. $LiPF_6$ is preferred among these in terms of output power of the battery and charge-discharge cycle characteristics.

The non-aqueous solvent to be contained in the electrolyte solution may be one that is used in a general electrolyte solution. Examples include lactone compounds, cyclic or acyclic carbonate esters, acyclic carboxylate esters, cyclic or acyclic ethers, phosphate esters, nitrile compounds, amide compounds, sulfone, sulfolane, and mixtures thereof.

These non-aqueous solvents may be used alone or in combination of two or more thereof.

Preferred among these non-aqueous solvents, in terms of output power of the battery and charge-discharge cycle characteristics, are lactone compounds, cyclic carbonate esters, acyclic carbonate esters, and phosphate esters. Lactone compounds, cyclic carbonate esters, and acyclic carbonate esters are more preferred, and mixtures of cyclic carbonate esters and acyclic carbonate esters are still more preferred. Mixtures of ethylene carbonate (EC) and diethyl carbonate (DEC) are particularly preferred.

The non-aqueous solvent to be contained in the electrolyte solution can be used as a dispersant in the raw material slurry. Examples of the non-aqueous solvent include N-methylpyrrolidone, dimethylformamide, diethylene carbonate, and propylene carbonate.

(3) Subsequently, the coated negative electrode active material in the raw material slurry is doped with at least one of lithium and lithium ions.

The method for doping the coated negative electrode active material with at least one of lithium and lithium ions is not limited. For example, in one method, the raw material slurry is used to produce a negative electrode for pre-charging, and a battery for pre-charging including the negative electrode for pre-charging and a positive electrode for pre-charging is produced; and then the battery for pre-charging is pre-charged. In another method, the coated negative electrode active material in the raw material slurry is doped by contact with at least one of a lithium source or a lithium ion source.

First, an example of the method for pre-charging the battery for pre-charging is described in (3-1) to (3-3) below.

(3-1-a) For example, the negative electrode for pre-charging can be produced as follows: the raw material slurry is applied to a membrane, and the pressure is applied or reduced to fix the coated negative electrode active material on the membrane.

FIG. 1(a) schematically shows how the raw material slurry is applied to a membrane. A raw material slurry containing a coated negative electrode active material 20 in which a negative electrode active material particle 24 is coated with a coating agent 25 is applied to a membrane 470.

The raw material slurry contains a conductive additive 26. The coating agent 25 may also contain the conductive additive 26.

The membrane is preferably one that can separate the coated negative electrode active material from a dispersion medium in the subsequent application or reduction of pressure. In addition, a membrane formed of a highly conductive material (conductive material) is preferred because such a membrane can be used as a current collector and does not interfere with electrical conductivity even when it is in contact with a current collector. For example, a material having a conductivity of 100 mS/cm or more can be suitably used.

Examples of materials having such properties include filter paper containing conductive fibers such as carbon fibers and metal meshes.

A preferred metal mesh is a stainless steel mesh. Examples include SUS316 twill woven wire mesh (Sunnet Industrial Co., Ltd.). As for the opening of the metal mesh, the size that does not allow the active material particles or the conductive material to pass through the metal mesh is preferred. For example, a 2300 mesh is preferably used.

The raw material slurry can be applied to the membrane using any coating device such as a bar coater or brush.

Subsequently, the pressure is applied or reduced to fix the coated negative electrode active material on the membrane.

The pressure can be applied by, for example, pressing the side coated with the raw material slurry using a pressing machine. The pressure can be reduced by, for example, placing a material such as filter paper or a mesh on the membrane at the side not coated with the raw material slurry and then sucking using a vacuum pump. The dispersion medium is removed from the raw material slurry by applying or reducing pressure, and the negative electrode active material is fixed on the membrane.

FIG. 1 (*b*) shows a negative electrode for pre-charging 210 in which the coated negative electrode active material 20 is fixed on the membrane 470.

As described above, a membrane formed of a conductive material can be used as a current collector, or such a membrane and a current collector can be used to function as one current collector by bringing them into contact with each other.

In the case of a membrane formed of a non-conductive material, such a membrane should be disposed adjacent to the separator. In addition, the membrane can be used as a separator. Examples of the membrane formed of a non-conductive material include an aramid separator (Japan Vilene Company, Ltd.).

In the case where the dispersion medium is an electrolyte solution, the dispersion medium may be removed by applying or reducing pressure to cause the electrolyte solution to pass through a membrane that allows passage of the electrolyte solution but not the coated negative electrode active material.

In addition, a higher pressure may be applied to the raw material slurry after the pressure is applied or reduced.

This step (also referred to as "pressing step") is carried out to increase the density of the negative electrode active material by further increasing the pressure difference than that in the previous application or reduction of pressure. The pressing step encompasses an action to apply pressure after the pressure is reduced and an action to further increase the pressure after the pressure is applied.

Further, the negative electrode for pre-charging fixed on the membrane may be transferred to a main surface of the current collector or separator may be carried out.

In this case, the negative electrode for pre-charging is transferred preferably by contact between one main surface of the negative electrode for pre-charging (specifically, the main surface opposite to the membrane) and the main surface of the current collector or separator.

In the case where the membrane is formed of a conductive material and is used as the current collector, the negative electrode for pre-charging is transferred preferably by contact between the main surface opposite to the membrane and the main surface of the separator. In the case where the membrane is not used as the current collector, the membrane is preferably removed after transfer.

(3-1-b) The negative electrode for pre-charging can also be produced by the following method.

In other words, the method includes a step of applying the raw material slurry to the current collector to form a slurry layer thereon, and a step of placing a separator on the slurry layer and upwardly absorbing the liquid through the separator so as to fix the coated negative electrode active material between the current collector and the separator.

Figure 2:
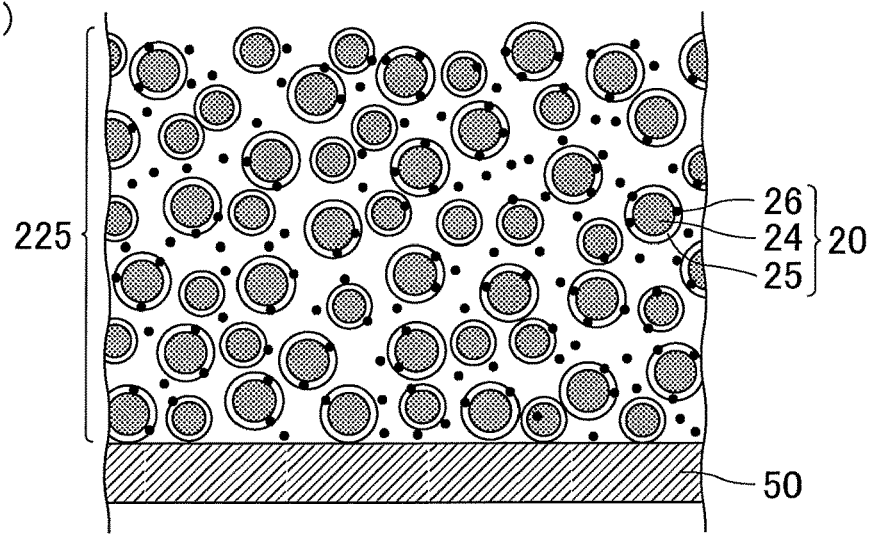
FIG. 2 (a), FIG. 2 (b), and FIG. 2 (c) are schematic views of a step of fixing a coated negative electrode active material between a current collector and a separator.
Figure 2:
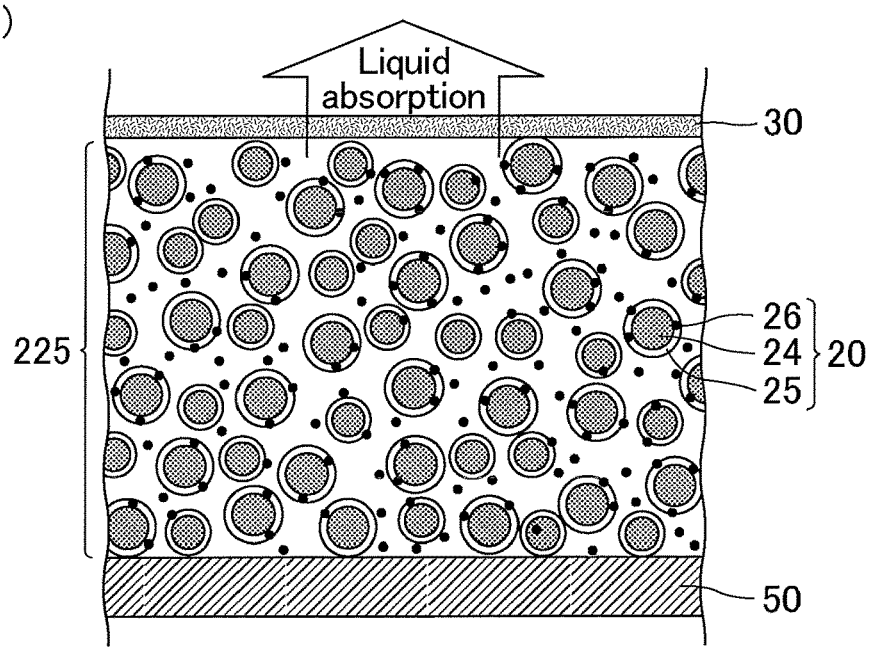
Figure 2:
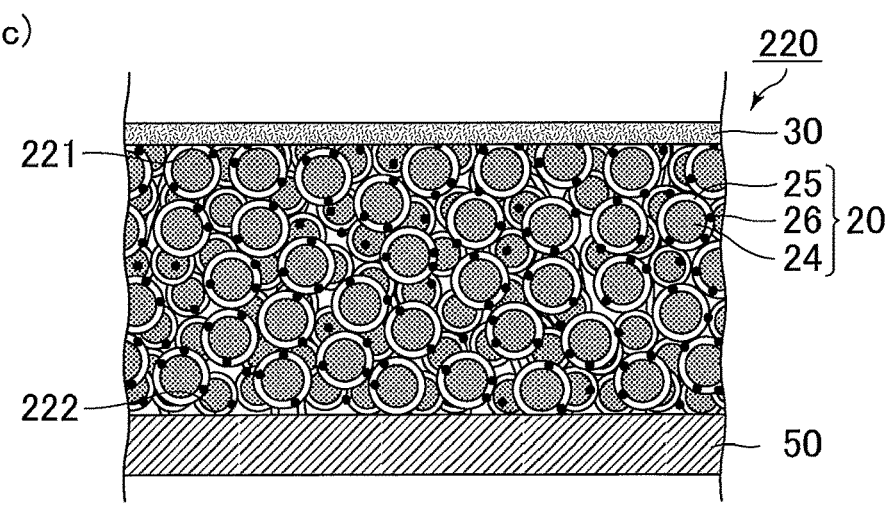

FIG. 2(*a*), FIG. 2(*b*), and FIG. 2(*c*) are schematic views of a step of fixing the coated negative electrode active material between the current collector and the separator.

First, a slurry containing the coated negative electrode active material is applied to the current collector to form a slurry layer thereon.

Examples of the current collector include aluminum, copper, titanium, stainless steel, nickel, baked carbon, conductive polymers, and conductive glass.

The slurry may be the same as the raw material slurry described above for (2). Conductive fibers as the conductive material may be further added and dispersed in the slurry.

The slurry is preferably an electrolyte slurry containing an electrolyte solution. The electrolyte solution may be the same that contained in the electrolyte slurry described above. In addition, the slurry may be a solvent slurry containing a solvent.

The slurry can be applied to the current collector using any coating device such as a bar coater or brush.

FIG. 2(*a*) schematically shows how the slurry is applied to a current collector 50 to form a slurry layer 225. A slurry containing the coated negative electrode active material 20 in which the negative electrode active material particle 24 is coated with the coating agent 25 is formed on the current collector 50. Thus, the slurry layer 225 is formed.

In the embodiment shown in FIG. 2(*a*), the negative electrode active material particle 24 is coated with the coating agent 25 to form the coated negative electrode active material 20, and the slurry contains the conductive additive 26. The coating agent 25 may also contain the conductive additive 26.

Subsequently, a separator is placed on the slurry layer, and the liquid is upwardly absorbed through the separator so as to fix the coated negative electrode active material between the current collector and the separator. First, as shown in FIG. 2(*b*), a separator 30 is placed on the slurry layer 225. Then, the liquid is upwardly absorbed through the separator 30.

Examples of the separator include aramid separators (Japan Vilene Company, Ltd.), microporous polyethylene films, microporous polypropylene films, multilayer films composed of a porous polyethylene film and a porous polypropylene film, nonwoven fabrics containing polyester fibers, aramid fibers, or glass fibers, and separators including ceramic microparticles such as silica, alumina, or titania particles attached to the surface of any of these films or nonwoven fabrics.

For liquid absorption, the pressure may be applied to the separator from above or below, and the liquid exuded from an upper side of the separator is absorbed; or the liquid may be upwardly drawn through the separator by reducing pressure. Alternatively, a liquid-absorbent material may be placed on the upper side of the separator to upwardly absorb the liquid through the separator.

Examples of the liquid-absorbing material include liquid-absorbing cloth such as towel, paper, and liquid-absorbing resins.

The electrolyte solution or the solvent is removed from the slurry by liquid absorption, and the coated negative electrode active material is fixed between the current collector and the separator. This form is loosely retained to the extent that the coated negative electrode active material does not flow.

The method for applying pressure is not limited, and various methods can be used. For example, the pressure can be applied using a known pressing machine or by placing a heavy material or the like as a weight. The pressure can be applied under vibrations with an ultrasonic vibrator or the like. In the case of applying pressure to the separator from above or below, the pressure is preferably 0.8 to 41 kg/cm$^2$, more preferably 0.9 to 10 kg/cm$^2$. The pressure in the above range is advantageous because it is possible to further increase the battery capacity.

FIG. 2 (c) shows a negative electrode for pre-charging 220 in which the coated negative electrode active material 20 is fixed between the current collector 50 and the separator 30.

In the negative electrode for pre-charging 220, a first main surface 221 of the negative electrode for pre-charging is in contact with the separator 30, and a second main surface 222 of the negative electrode for pre-charging is in contact with the current collector 50.

When the negative electrode for pre-charging is produced by the method described above, the electrode is sandwiched between the separator and the current collector. Thus, advantageously, there is no need to separately carry out a step of disposing the separator and the current collector to sandwich the electrode therebetween, and an electrode having a preferred embodiment as a bipolar electrode can be produced in fewer steps.

(3-2) Next, a battery for pre-charging including a negative electrode for pre-charging and a positive electrode for pre-charging is produced.

For example, the battery for pre-charging can be produced as follows: a negative electrode for pre-charging is combined with a positive electrode for pre-charging as a counter electrode and housed with a separator in a cell case; an electrolyte solution is injected into the cell case; and the cell case is sealed. For example, the battery for pre-charging can also be produced as follows: a positive electrode for pre-charging is formed on one side of the current collector and a negative electrode for pre-charging is formed on the other side of current collector so as to produce a bipolar electrode; the bipolar electrode is layered with a separator and housed in a cell case; an electrolyte solution is injected into the cell case; and the cell case is sealed.

The positive electrode for pre-charging may be a positive electrode containing a positive electrode active material or a lithium metal electrode. Since the positive electrode active material is expensive, it is preferred to use a lithium metal electrode.

A positive electrode containing a positive electrode active material, if intended to be used, can be produced by applying the positive electrode active material to the current collector with a binder and drying.

Examples of the positive electrode active material include complex oxides of lithium and transition metals (e.g., $LiCoO_2$, $LiNiO_2$, $LiMnO_2$, and $LiMn_2O_4$), and phosphate containing lithium and a transition metal (e.g., $LiFePO_4$).

Examples of the binder include high molecular weight compounds such as starch, polyvinylidene fluoride, polyvinyl alcohol, carboxymethyl cellulose, polyvinyl pyrrolidone, tetrafluoroethylene, styrene-butadiene rubber, polyethylene, and polypropylene.

Examples of the current collector include copper, aluminum, titanium, stainless steel, nickel, baked carbon, conductive polymers, and conductive glass.

Examples of the separator include microporous polyethylene films, microporous polypropylene films, multilayer films composed of a porous polyethylene film and a porous polypropylene film, nonwoven fabrics containing polyester fibers, aramid fibers, or glass fibers, and separators including ceramic microparticles such as silica, alumina, or titania particles attached to the surface of any of these films or these nonwoven fabrics.

The electrolyte solution may be the above-described electrolyte solution to be contained in the raw material slurry.

(3-3) A battery for pre-charging is pre-charged.

Thus, the coated negative electrode active material can be doped with at least one of lithium and lithium ions.

The method for pre-charging is not limited, but a method in which the battery for pre-charging is subjected to one charge-discharge cycle is preferred.

In addition, examples of the method in which the coated negative electrode active material in the raw material slurry is doped by contact with at least one of a lithium source or a lithium ion source include a method in which the coated negative electrode active material is kneaded with lithium metal.

The solvent that can be used for kneading the coated negative electrode active material with lithium metal may be one that is used in a general electrolyte solution. Examples include lactone compounds, cyclic or acyclic carbonate esters, acyclic carboxylate esters, cyclic or acyclic ethers, phosphate ester, nitrile compounds, amide compounds, sulfone, sulfolane, and mixtures thereof. These non-aqueous solvents may be used alone or in combination of two or more thereof.

The coated negative electrode active material can be kneaded with lithium metal using a device such as a mortar in experiment and a device such as a roll kneader, planetary mixer, or planetary centrifugal mixer in production. In addition, a kneading mixer with balls such as a ball mill, planetary ball mill, or bead mill can be used. Alternatively, kneading can be carried out using balls in a planetary centrifugal mixer.

The above method can produce a coated negative electrode active material for lithium ion batteries in which at least a portion of the surface of a particulate negative electrode active material for lithium ion batteries is coated with a coating agent and the coated negative electrode active material is doped with at least one of lithium and lithium ions.

As described later, in the case where the thus-produced coated negative electrode active material for lithium ion batteries is used to produce a negative electrode for lithium ion batteries, the battery for pre-charging needs to be disassembled.

Presumably, the above method can also produce a slurry for lithium ion batteries containing a dispersion medium and a coated negative electrode active material for lithium ion batteries wherein at least a portion of the surface of a particulate negative electrode active material for lithium ion batteries is coated with a coating agent and the coated negative electrode active material is doped with at least one of lithium and lithium ions. The present invention also encompasses such a slurry for lithium ion batteries.

The slurry for lithium ion batteries of the present invention may contain other components such as a conductive additive, in addition to the coated negative electrode active material for lithium ion batteries and the dispersion medium.

The conductive additive may be the same as that contained in the coating agent.

The amount of the coated negative electrode active material for lithium ion batteries in the slurry for lithium ion batteries of the present invention is preferably 25 to 80% by weight, more preferably 40 to 65% by weight, relative to the total weight of the slurry for lithium ion batteries.

The amount of the dispersion medium in the slurry for lithium ion batteries of the present invention is preferably 20 to 75% by weight, more preferably 35 to 60% by weight, relative to the total weight of the slurry for lithium ion batteries.

[Negative Electrode for Lithium Ion Batteries]

A negative electrode for lithium ion batteries of the present invention includes the coated negative electrode active material for lithium ion batteries of the present invention described above.

The method for producing the negative electrode for lithium ion batteries of the present invention is not limited. For example, in the case where the coated negative electrode active material for lithium ion batteries of the present invention is produced by the method described above, the negative electrode for lithium ion batteries can be produced as follows: the battery for pre-charging is disassembled to extract the coated negative electrode active material for lithium ion batteries, and the coated negative electrode active material is applied to a current collector with a binder and dried. In this case, preferably, the coated negative electrode active material for lithium ion batteries is extracted in the absence of moisture (e.g., inside of a glove box).

The binder and the current collector may be the same as those to be used to produce the positive electrode for pre-charging.

In addition, the negative electrode for pre-charging taken out from the disassembled battery for pre-charging can be used as the negative electrode for lithium ion batteries of the present invention.

Further, after the negative electrode for pre-charging is taken out from the disassembled battery for pre-charging, the slurry fixed on the negative electrode for pre-charging can be re-slurried with a dispersion medium and the negative electrode for lithium ion batteries of the present invention can be produced by the method for producing the negative electrode for pre-charging. In this case, the thus-obtained slurry is used as a raw material slurry, and the raw material slurry is applied to the membrane or current collector according to the method (3-1-a) or (3-1-b) described as an example of the method for producing the negative electrode for pre-charging. In the case of the method (3-1-b), a separator is further placed on the slurry layer, and the pressure is applied or reduced to fix the negative electrode active material for lithium ion batteries on the membrane or current collector. In this manner, the negative electrode for lithium ion batteries of the present invention can be produced.

Details such as the types of the dispersion medium and membrane to be used and the method for applying or reducing pressure are the same as described for the production of the negative electrode for pre-charging. Thus, a detailed description thereof is omitted.

[Lithium Ion Battery]

A lithium ion battery of the present invention includes the negative electrode for lithium ion batteries of the present invention.

The method for producing the lithium ion battery of the present invention is not limited. For example, the lithium ion battery can be produced as follows: the negative electrode for lithium ion batteries of the present invention is combined with a positive electrode for lithium ion batteries, and housed with a separator in a cell case; an electrolyte solution is injected into the cell case; and the cell case is sealed. The lithium ion battery can also be produced as follows: the negative electrode for lithium ion batteries of the present invention is formed on one side of the current collector and a positive electrode for lithium ion batteries is formed on the other side of the current collector so as to produce a bipolar electrode; the bipolar electrode is layered with a separator and housed in a cell case; an electrolyte solution is injected into the cell case; and the cell case is sealed.

The positive electrode for lithium ion batteries may be a positive electrode containing a positive electrode active material. The positive electrode containing a positive electrode active material can be produced by applying a positive electrode active material to a current collector with a binder and drying.

Examples of the positive electrode active material include complex oxides of lithium and transition metals (e.g., $LiCoO_2$, $LiNiO_2$, $LiMnO_2$, and $LiMn_2O_4$), phosphate containing lithium and a transition metal (e.g., $LiFePO_4$), transition metal oxides (e.g., $MnO_2$ and $V_2O_5$), transition metal sulfides (e.g., $MoS_2$ and $TiS_2$), and conductive polymers (e.g., polyaniline, polypyrrole, polythiophene, polyacetylene, poly-p-phenylene, and polyvinylcarbazole).

The binder and the current collector may be the same as those to be used to produce the positive electrode for pre-charging.

The separator and the electrolyte solution may be the same as those to be used to produce the battery for pre-charging.

[Lithium Ion Secondary Battery]

The lithium ion battery of the present invention can be used as a lithium ion secondary battery. The lithium ion battery of the present invention includes a negative electrode having lithium ions contained in the slurry for lithium ion batteries of the present invention. Thus, the irreversible capacity can be reduced.

In other words, the present invention also encompasses a lithium ion secondary battery including the negative electrode for lithium ion batteries of the present invention, wherein the irreversible capacity is 0.1 to 50 mAh/g.

In the lithium ion secondary battery of the present invention, the irreversible capacity is preferably 0.1 to 50 mAh/g, more preferably 0.5 to 35 mAh/g.

The irreversible capacity of the lithium ion secondary battery can be determined by charging and discharging the battery by the method described in Examples and subtracting the discharge capacity from the charge capacity in the first charge-discharge cycle. The irreversible capacity described above refers to the irreversible capacity per unit weight of the active material.

EXAMPLES

The present invention will be specifically described below with reference to non-limiting examples, and various modifications may be made without departing from the scope of the present invention. The "part(s)" and "%" refer to part(s) by weight and % by weight, respectively, unless otherwise specified.

Example 1

[Preparation of Coating Resin Solution]

A four-necked flask equipped with a stirrer, a thermometer, a reflux condenser, a dropping funnel, and a nitrogen gas inlet tube was charged with ethyl acetate (83 parts) and methanol (17 parts), and the temperature was raised to 68° C. Subsequently, a monomer mixture containing methacrylic acid (242.8 parts), methyl methacrylate (97.1 parts), 2-ethylhexylmethacrylate (242.8 parts), ethyl acetate (52.1 parts), and methanol (10.7 parts), and an initiator solution containing 2,2'-azobis(2,4-dimethylvaleronitrile) (0.263 parts) dissolved in ethyl acetate (34.2 parts) were continuously added dropwise through the dropping funnel over 4 hours under stirring, while blowing nitrogen into the four-necked flask, to carryout radical polymerization. After the completion of the dropwise addition, an initiator solution containing 2,2'-azobis(2,4-dimethylvaleronitrile) (0.583 parts) dissolved in ethyl acetate (26 parts) was continuously added over 2 hours through the dropping funnel. The polymerization was further continued at the boiling point for 4 hours. After the solvent was removed and a resin (582 parts) was obtained, isopropanol (1,360 parts) was added to the resin. Thus, a coating resin solution AS containing a coating resin A was obtained. The coating resin solution AS had a resin solid concentration of 30% by weight.

[Production of Coated Negative Electrode Active Material Particles]

Non-graphitizable carbon (Kureha Battery Materials Japan Co., Ltd., CARBOTRON (trademark) PS(F), 90 parts by weight) was fed into a universal mixer. While stirring at 150 rpm at room temperature, the coating resin solution AS (resin solid concentration: 30% by weight) was added dropwise thereto over 60 minutes to give a resin solids content of 5 parts by weight, followed by stirring for additional 30 minutes.

Subsequently, while stirring, acetylene black (Denka Company Limited., Denka Black (trademark), 5 parts by weight) was added in three portions. The temperature was raised to 70° C. while stirring for 30 minutes, the pressure was reduced to 0.01 MPa, and the mixture was kept in that state for 30 minutes. In this manner, coated negative electrode active material particles PA were obtained.

[Preparation of Electrolyte Solution]

LiPF$_6$ was dissolved in a mixed solvent of ethylene carbonate (EC) and diethyl carbonate (DEC) (volume ratio 1:1) at 1 mol/L. Thus, an electrolyte solution for lithium ion batteries was prepared.

[Measurement of Liquid Absorption Rate of Coating Resin]

The coating resin solution AS formed from a vinyl resin was dried at room temperature under the atmospheric conditions, and then the weight was measured. The thus-obtained dried coating was immersed in the electrolyte solution at 50° C. for 3 days. Subsequently, the coating was extracted and the electrolyte solution attached to the surface of the coating was lightly wiped off with gauze, and the weight was measured. The liquid absorption rate of the coating resin A was 20% as determined from the weight change before and after immersion.

[Measurement of Tensile Strength at Break of Coating Resin that has Absorbed Liquid]

The coating resin A was immersed in the electrolyte solution under the same conditions as in the measurement of the liquid absorption rate of the coating resin, and then punched into a dumbbell shape. The tensile strength at break was measured to be 20%.

[Production of Positive Electrode for Lithium Ion Batteries]

LiFePO$_4$ powder (SLFP-ES01 made in China, 85 parts by weight) as positive electrode active material particles and acetylene black (Denka Company Limited., Denka Black (trademark), 10 parts by weight) were mixed with a solution of polyvinylidene fluoride (Sigma-Aldrich, 5 parts by weight) in N-methylpyrrolidone (hereinafter, NMP). Thus, a solvent slurry was prepared.

The solvent slurry was applied using a coater to one side of aluminum electrolytic foil having a thickness of 20 µm under the atmospheric conditions, and the applied slurry was dried at 100° C. for 15 minutes. Thus, a positive electrode for lithium ion batteries was produced. The weight per unit area was 10.5 mg/cm$^2$ as determined from the weight change before and after drying.

[Production of Coated Negative Electrode Active Material for Lithium Ion Batteries]

The coated negative electrode active material particles PA (100 parts by weight) as negative electrode active material particles were mixed with the electrolyte solution to an amount of 55% by weight relative to the electrolyte solution, and the mixture was stirred in a planetary mixer. Thus, a raw material slurry 1 was prepared.

An aramid separator (Japan Vilene Company, Ltd.) was provided as a membrane. The raw material slurry 1 was applied to the aramid separator and subjected to suction filtration (reduction of pressure) and to a pressure of 1.5 kg/cm$^2$ so as to fix the coated negative electrode active material particles PA on the aramid separator. Thus, a negative electrode for pre-charging 1 was produced.

The negative electrode for pre-charging 1 was punched out to a diameter of 15 mm. This punched-out electrode and a positive electrode for pre-charging formed of Li metal having a diameter of 15 mm were disposed in a 2032-type coin cell in such a manner that these electrodes were located at the opposite sides.

Copper foil having a thickness of 20 µm was used as a current collector on the negative electrode side, and the aramid separator of the negative electrode for pre-charging was disposed on the separator side (positive electrode side).

Two separators (Celgard 3501) were interposed between the electrodes. Thus, a cell for pre-charging was produced. The electrolyte solution was injected into the cell, and the cell was sealed. Thus, a battery for pre-charging 1 was produced.

The battery for pre-charging 1 was charged in CC-CV mode at a current of 0.1 C and a minimum potential of 0 V and discharged in CC mode at a current of 0.1 C and a maximum potential of 1.5 V with a 10-minute interval therebetween, using a battery charge/discharge system "HJ0501SM8A" (Hokuto Denko Corporation) at room temperature. In this manner, pre-charging was carried out.

The battery for pre-charging 1 was disassembled, and the positive electrode for pre-charging and the separators were taken out. Attached on the aramid separator was a paste-like slurry containing a coated negative electrode active material HCA for lithium ion batteries (i.e., the coated negative electrode active material particles PA doped with at least one of lithium and lithium ions) and the electrolyte solution.

DEC was added to the slurry on the aramid separator taken out from the battery for pre-charging 1 to extract the slurry. Subsequently, the electrolyte was removed from the slurry by suction filtration, and the DEC was dried. Thus, the coated negative electrode active material HCA for lithium ion batteries doped with at least one of lithium and lithium ions was obtained.

The volume average particle size (volume median diameter: Dv 50) of the coated negative electrode active material HCA for lithium ion batteries was 12 µm as measured using Microtrack (Nikkiso Co., Ltd., 9320-X100).

[Production of Negative Electrode for Lithium Ion Batteries]

The coated negative electrode active material HCA for lithium ion batteries (90 parts by weight) and acetylene black (Denka Company Limited., Denka Black (trademark), 5 parts by weight) were mixed with a solution of polyvinylidene fluoride (Sigma-Aldrich, 5 parts by weight) from which moisture was removed in N-methylpyrrolidone (hereinafter, NMP). Thus a solvent slurry was prepared.

The solvent slurry was applied using a coater to one side of copper foil having a thickness of 20 µm under argon, and the applied slurry was dried at 100° C. for 15 minutes. Thus, a negative electrode for lithium ion batteries was produced. The weight per unit area was 6.0 mg/cm$^2$ as determined from the weight change before and after drying.

[Evaluation of Irreversible Capacity]

The negative electrode for lithium ion batteries and a positive electrode for lithium ion batteries punched out to a diameter of 15 mm were disposed in a 2032-type coin cell in such a manner that these electrodes were located at the opposite sides, with each current collector facing outside.

Two separators (Celgard 3501) were interposed between the electrodes. Further, an aramid separator was interposed between one of the separators and the negative electrode for lithium ion batteries. Thus, a cell for irreversible capacity evaluation was produced. The electrolyte solution was injected into the cell, and the cell was sealed. Thus, a battery for irreversible capacity evaluation was produced.

The battery for irreversible capacity evaluation was charged in CC-CV mode at a current of 0.1 C and a maximum potential of 4.0 V and discharged in CC mode at a current of 0.1 C and a minimum potential of 1.5 V with a 10-minute interval therebetween, using a battery charge/discharge system "HJ0501SM8A" (Hokuto Denko Corporation) at room temperature. At this time, the charge capacity (mAh/ϕ15 mm) after charging and the discharge capacity (mAh/ϕ15 mm) after discharging were measured, and the discharge capacity was subtracted from the charge capacity so as to determine the irreversible capacity (mAh/ϕ15 mm). The irreversible capacity (mAh/g) per unit weight of the active material was determined from the irreversible capacity.

Example 2

[Production of Coated Negative Electrode Active Material for Lithium Ion Batteries]

In the same manner as in Example 1, the coated negative electrode active material particles PA (100 parts by weight) as negative electrode active material particles were mixed with the electrolyte solution to an amount of 55% by weight relative to the electrolyte solution, and the mixture was stirred in a planetary mixer. Thus, a raw material slurry 2 was prepared.

An aramid separator (Japan Vilene Company, Ltd.) was provided as a membrane. The raw material slurry 2 was applied to the aramid separator and subjected to suction filtration (reduction of pressure) and to a pressure of 1.5 kg/cm$^2$ so as to fix the coated negative electrode active material particles PA on the aramid separator. Thus, a negative electrode for pre-charging 2 was produced.

The negative electrode for pre-charging 2 was punched out to a diameter of 15 mm. This punched-out electrode and a positive electrode for pre-charging formed of Li metal having a diameter of 15 mm were disposed in a 2032-type coin cell in such a manner that these electrodes were located at the opposite sides.

Copper foil having a thickness of 20 µm was used as a current collector on the negative electrode side, and the aramid separator of the negative electrode for pre-charging 2 was disposed on the separator side (positive electrode side).

Two separators (Celgard 3501) were interposed between the electrodes. Thus, a cell for pre-charging was produced. The electrolyte solution was injected into the cell, and the cell was sealed. Thus, a battery for pre-charging 2 was produced.

The battery for pre-charging 2 was charged in CC-CV mode at a current of 0.1 C and a minimum potential of 0 V and discharged in CC mode at a current of 0.1 C and a maximum potential of 1.5 V with a 10-minute interval therebetween, using a battery charge/discharge system "HJ0501SM8A" (Hokuto Denko Corporation) at room temperature. In this manner, pre-charging was carried out.

The battery for pre-charging 2 was disassembled, and the positive electrode for pre-charging and the separators were taken out. Attached on the aramid separator was the paste-like slurry containing a coated negative electrode active material HCA for lithium ion batteries (i.e., the coated negative electrode active material particles PA doped with at least one of lithium and lithium ions) and the electrolyte solution.

[Production of Negative Electrode for Lithium Ion Batteries]

DEC was added to the slurry on the aramid separator taken out from the battery for pre-charging 2 to extract the slurry. Subsequently, the extracted slurry (containing 100 parts by weight of the coated negative electrode active material HCA for lithium ion batteries) was used to produce a negative electrode for lithium ion batteries in the same manner as in the negative electrode for pre-charging 2 by suction filtration (reduction of pressure) upwardly through an aramid separator. The weight per unit area was 6.0 mg/cm$^2$ as determined from the weight change before and after drying.

[Evaluation of Irreversible Capacity]

The negative electrode for lithium ion batteries and a positive electrode for lithium ion batteries punched out to a diameter of 15 mm were disposed in a 2032-type coin cell in such a manner that these electrodes were located at the opposite sides.

Copper foil having a thickness of 20 µm was used as a current collector on the negative electrode side, and the aramid separator was disposed on the separator side (positive electrode side).

Two separators (Celgard 3501) were interposed between the electrodes. Thus, a cell for irreversible capacity evaluation was produced. The electrolyte solution was injected into the cell, and the cell was sealed. Thus, a battery for irreversible capacity evaluation was produced.

The battery for irreversible capacity evaluation was charged in CC-CV mode at a current of 0.1 C and a maximum potential of 4.0 V and discharged in CC mode at a current of 0.1 C and a minimum potential of 1.5 V with a 10-minute interval therebetween, using a battery charge/discharge system "HJ0501SM8A" (Hokuto Denko Corporation) at room temperature. At this time, the charge capacity (mAh/φ15 mm) after charging and the discharge capacity (mAh/φ15 mm) after discharging were measured, and the discharge capacity was subtracted from the charge capacity so as to determine the irreversible capacity (mAh/φ15 mm). The irreversible capacity (mAh/g) per weight of the active material was determined from the irreversible capacity.

Example 3

[Production of Coated Negative Electrode Active Material Particles]

Coated negative electrode active material particles PB were obtained in the same manner as in Example 1, except that a coating resin solution BS (resin solid concentration: 30% by weight) containing sodium alginate as a coating resin (coating resin B) was used instead of the coating resin solution AS.

The liquid absorption rate of the sodium alginate (coating resin B) used was 4%, and the tensile strength at break thereof was 3%.

[Production of Coated Negative Electrode Active Material for Lithium Ion Batteries]

A raw material slurry 3 was prepared in the same manner as in Example 2, except that the coated negative electrode active material particles PB were used instead of the coated negative electrode active material particles PA.

An aramid separator (Japan Vilene Company, Ltd.) was provided as a membrane. The raw material slurry 3 was applied to the aramid separator and subjected to suction filtration (reduction of pressure) and to a pressure of 1.5 kg/cm$^2$ so as to fix the coated negative electrode active material particles PB on the aramid separator. Thus, a negative electrode for pre-charging 3 was produced.

The negative electrode for pre-charging 3 was punched out to a diameter of 15 mm. This punched-out electrode and a positive electrode for pre-charging formed of Li metal having a diameter of 15 mm were disposed in a 2032-type coin cell in such a manner that these electrodes were located at the opposite sides.

Copper foil having a thickness of 20 μm was used as a current collector on the negative electrode side, and the aramid separator of the negative electrode for pre-charging 3 was disposed on the separator side (positive electrode side).

Two separators (Celgard 3501) were interposed between the electrodes. Thus, a cell for pre-charging was produced. The electrolyte solution was injected into the cell, and the cell was sealed. Thus, a battery for pre-charging 3 was produced.

The battery for pre-charging 3 was charged in CC-CV mode at a current of 0.1 C and a minimum potential of 0 V and discharged in CC mode at a current of 0.1 C and a maximum potential of 1.5 V with a 10-minute interval therebetween, using a battery charge/discharge system "HJ0501SM8A" (Hokuto Denko Corporation) at room temperature. In this manner, pre-charging was carried out.

The battery for pre-charging 3 was disassembled, and the positive electrode for pre-charging and the separators were taken out. Attached on the aramid separator was a paste-like slurry containing a coated negative electrode active material HCB for lithium ion batteries (i.e., the coated negative electrode active material particles PB doped with at least one of lithium and lithium ions) and the electrolyte solution.

[Production of Negative Electrode for Lithium Ion Batteries]

DEC was added to the slurry on the aramid separator taken out from the battery for pre-charging 3 to extract the slurry. Subsequently, the extracted slurry (containing 100 parts by weight of the coated negative electrode active material HCB for lithium ion batteries) was used to produce a negative electrode for lithium ion batteries in the same manner as in the negative electrode for pre-charging 3 by suction filtration (reduction of pressure) upwardly through an aramid separator. The weight per unit area was 6.0 mg/cm$^2$ as determined from the weight change before and after drying.

[Evaluation of Irreversible Capacity]

The negative electrode for lithium ion batteries and a positive electrode for lithium ion batteries punched out to a diameter of 15 mm were disposed in a 2032-type coin cell in such a manner that these electrodes were located at the opposite sides.

Copper foil having a thickness of 20 μm was used as a current collector on the negative electrode side, and the aramid separator was disposed on the separator side (positive electrode side).

Two separators (Celgard 3501) were interposed between the electrodes. Thus, a cell for irreversible capacity evaluation was produced. The electrolyte solution was injected into the cell, and the cell was sealed. Thus, a battery for irreversible capacity evaluation was produced.

The battery for irreversible capacity evaluation was charged in CC-CV mode at a current of 0.1 C and a maximum potential of 4.0 V and discharged in CC mode at a current of 0.1 C and a minimum potential of 1.5 V with a 10-minute interval therebetween, using a battery charge/discharge system "HJ0501SM8A" (Hokuto Denko Corporation) at room temperature. At this time, the charge capacity (mAh/φ15 mm) after charging and the discharge capacity (mAh/φ15 mm) after discharging were measured, and the discharge capacity was subtracted from the charge capacity so as to determine the irreversible capacity (mAh/φ15 mm). The irreversible capacity (mAh/g) per weight of the active material was determined from the irreversible capacity.

Comparative Example 1

Non-graphitizable carbon (Kureha Battery Materials Japan Co., Ltd., CARBOTRON (trademark) PS(F), 90 parts by weight) as negative electrode active material particles and acetylene black (Denka Company Limited., Denka Black (trademark), 5 parts by weight) were mixed with a solution of polyvinylidene fluoride (Sigma-Aldrich, 5 parts by weight) in N-methylpyrrolidone (hereinafter, NMP). Thus, a solvent slurry 1' was prepared.

The solvent slurry 1' was applied using a coater to one side of copper foil having a thickness of 20 μm under argon, and the applied slurry was dried at 100° C. for 15 minutes. Thus, a negative electrode for lithium ion batteries was produced. The weight per unit area was 6.0 mg/cm$^2$ as determined from the weight change before and after drying.

Subsequently, a battery for irreversible capacity evaluation was produced in the same manner as in Example 1, and the battery for irreversible capacity evaluation was charged and discharged under the same conditions as in Example 1 to determine the irreversible capacity (mAh/φ15 mm). Then, the irreversible capacity (mAh/g) per weight of the active material was determined.

Comparative Example 2

The coated negative electrode active material particles PA (90 parts by weight) as negative electrode active material particles and acetylene black (Denka Company Limited., Denka Black (trademark), 5 parts by weight) were mixed with a solution of polyvinylidene fluoride (Sigma-Aldrich, 5 parts by weight) in N-methylpyrrolidone (hereinafter, NMP). Thus, a solvent slurry 2' was prepared.

The solvent slurry 2' was applied using a coater to one side of copper foil having a thickness of 20 μm under argon, and the applied slurry was dried at 100° C. for 15 minutes. Thus, a negative electrode for lithium ion batteries was produced. The weight per unit area was 6.0 mg/cm$^2$ as determined from the weight change before and after drying.

Subsequently, a battery for irreversible capacity evaluation was produced in the same manner as in Example 1, and the battery for irreversible capacity evaluation was charged and discharged under the same conditions as in Example 1 to determine the irreversible capacity (mAh/φ15 mm). Then, the irreversible capacity (mAh/g) per weight of the active material was determined.

Comparative Example 3

A battery for pre-charging was produced using the negative electrode for lithium ion batteries produced in Comparative Example 1 as a negative electrode for pre-charging, and the battery for pre-charging was pre-charged in the same manner as in Example 1. In the same manner as in Example 1, the battery for pre-charging was disassembled to extract the slurry containing the negative electrode active material particles doped with at least one of lithium and lithium ions. The slurry was used to produce a negative electrode for lithium ion batteries. A battery for irreversible capacity evaluation was produced using the negative electrode for lithium ion batteries, and charged and discharged under the same conditions as in Example 1 to determine the irreversible capacity (mAh/φ15 mm). Then, the irreversible capacity (mAh/g) per weight of the active material was determined.

Comparative Example 4

The coated negative electrode active material particles PA (100 parts by weight) as negative electrode active material particles were used to produce a negative electrode for lithium ion batteries in the same manner as in Example 2 by suction filtration (reduction of pressure) upwardly through an aramid separator. The weight per unit area was 6.0 mg/cm$^2$ as determined from the weight change before and after drying.

Subsequently, a battery for irreversible capacity evaluation was produced in the same manner as in Example 2, and the battery for irreversible capacity evaluation was charged and discharged under the same conditions as in Example 2 to determine the irreversible capacity (mAh/φ15 mm). Then, the irreversible capacity (mAh/g) per weight of the active material was determined.

Comparative Example 5

Non-graphitizable carbon (Kureha Battery Materials Japan Co., Ltd., CARBOTRON (trademark) PS(F)) as negative electrode active material particles was used instead of the coated negative electrode active material particles PA used in Example 2 to produce a negative electrode for lithium ion batteries. Subsequently, a battery for irreversible capacity evaluation was produced in the same manner as in Example 2, and the battery for irreversible capacity evaluation was charged and discharged under the same conditions as in Example 2 to determine the irreversible capacity (mAh/φ15 mm). Then, the irreversible capacity (mAh/g) per weight of the active material was determined.

Comparative Example 6

A battery for pre-charging was produced and pre-charged in the same manner as in Example 2, using the negative electrode for lithium ion batteries produced in Comparative Example 5 as a negative electrode for pre-charging. In the same manner as in Example 2, the battery for pre-charging was disassembled to extract the slurry containing the negative electrode active material particles doped with at least one of lithium and lithium ions. The slurry was used to produce a negative electrode for lithium ion batteries. A battery for irreversible capacity evaluation was produced using the negative electrode for lithium ion batteries, and charged and discharged under the same conditions as in Example 2 to determine the irreversible capacity (mAh/φ15 mm). Then, the irreversible capacity (mAh/g) per weight of the active material was determined.

TABLE 1

| | Electrode composition (wt %) | | | | | | Charge | Discharge | Irreversible | Irreversible | |
|---|---|---|---|---|---|---|---|---|---|---|---|
| | Active material | | | Binder | Conductive additive Acetylene | Electrode Weight per unit area | Pre- | capacity of evaluated battery (mAh/φ | capacity of evaluated battery (mAh/φ | capacity of evaluated battery (mAh/φ | capacity per weight of active material | Charging time |
| | HC | PA | PB | PVdF | black | (mg/cm$^2$) | charging | 15 mm) | 15 mm) | 15 mm) | (mAh/g) | (h) |
| Example 1 | — | 90 | — | 5 | 5 | 6.0 | Pre-charged | 2.72 | 2.60 | 0.12 | 11.3 | 13.5 |
| Example 2 | — | 100 | — | — | — | 6.0 | Pre-charged | 2.72 | 2.62 | 0.10 | 9.4 | 12.7 |
| Example 3 | — | — | 100 | — | — | 6.0 | Pre-charged | 2.72 | 2.54 | 0.18 | 17.0 | 14.5 |
| Comparative Example 1 | 90 | — | — | 5 | 5 | 6.0 | Not pre-charged | 2.72 | 1.89 | 0.83 | 78.3 | 21.0 |
| Comparative Example 2 | — | 90 | — | 5 | 5 | 6.0 | Not pre-charged | 2.73 | 1.42 | 1.31 | 123.6 | 18.6 |

TABLE 1-continued

| | Electrode composition (wt %) | | | | Electrode Weight per unit area (mg/cm²) | Pre-charging | Charge capacity of evaluated battery (mAh/φ 15 mm) | Discharge capacity of evaluated battery (mAh/φ 15 mm) | Irreversible capacity of evaluated battery (mAh/φ 15 mm) | Irreversible capacity per weight of active material (mAh/g) | Charging time (h) |
|---|---|---|---|---|---|---|---|---|---|---|---|
| | Active material | | | Binder | Conductive additive Acetylene | | | | | | |
| | HC | PA | PB | PVdF | black | | | | | | |
| Comparative Example 3 | 90 | — | — | 5 | 5 | 6.0 | Pre-charged | 2.73 | 2.14 | 0.59 | 55.6 | 16.2 |
| Comparative Example 4 | — | 100 | — | — | — | 6.0 | Not pre-charged | 2.73 | 1.25 | 1.48 | 139.6 | 19.7 |
| Comparative Example 5 | 100 | — | — | — | — | 6.0 | Not pre-charged | 2.72 | 1.81 | 0.91 | 85.8 | 23.5 |
| Comparative Example 6 | 100 | — | — | — | — | 6.0 | Pre-charged | 2.73 | 2.38 | 0.35 | 33.0 | 16.7 |

In the table, HC represents non-graphitizable carbon particles; PA represents non-graphitizable carbon particles coated with the coating resin A; PB represents non-graphitizable carbon particles coated with the coating resin B; and PVdF represents polyvinylidene fluoride.

As is clear from the results of Table 1, in the case of the lithium ion batteries in which the negative electrode contains the coated negative electrode active material for lithium ion batteries obtained by coating at least a portion of the surface of a negative electrode active material with a coating resin and doping the coated negative electrode active material with at least one of lithium and lithium ions by pre-charging as in Examples 1, 2, and 3, it is possible to reduce the irreversible capacity per weight of the active material and the charging time is short (i.e., excellent input characteristics).

In contrast, in the case of the batteries not pre-charged as in Comparative Examples 1, 2, 4, and 5, the irreversible capacity is high. In addition, in the case of the batteries containing a negative electrode active material not coated with a coating resin as in Comparative Examples 3 and 6, it is possible to relatively reduce the irreversible capacity by pre-charging, but the charging time is long (i.e., poor input characteristics).

INDUSTRIAL APPLICABILITY

The coated negative electrode active material for lithium ion batteries of the present invention is particularly useful as a negative electrode active material for use in batteries such as bipolar secondary batteries and lithium ion secondary batteries for mobile phones, personal computers, hybrid vehicles, and electric vehicles.

REFERENCE SIGNS LIST

20 Coated negative electrode active material
24 Negative electrode active material particles
25 Coating agent
26 Conductive additive
30 Separator
50 Current collector
210 Pre-charge negative electrode
221 First main surface of negative electrode for pre-charging
222 Second main surface of negative electrode for pre-charging
225 Slurry layer
470 Membrane

The invention claimed is:

1. A coated negative electrode active material for lithium ion batteries,
wherein:
at least a portion of the surface of a particulate negative electrode active material for lithium ion batteries is coated with a coating agent,
the negative electrode active material for lithium ion batteries does not contain silicon, and is a non-graphitizable carbon,
the coated negative electrode active material for lithium ion batteries is free of starch, polyvinylidene fluoride, polyvinyl alcohol, carboxymethyl cellulose, polyvinyl pyrrolidone, tetrafluoroethylene, styrene-butadiene rubber, polyethylene, and polypropylene,
the coating agent contains a coating resin and a conductive additive,
the coating resin has a glass transition point of 80° C. to 200° C.,
the coating resin is a resin containing a polymer including about 41.7% by weight of (meth)acrylic acid, about 16.6% by weight of methyl (meth)acrylate and about 41.7% by weight of 2-ethylhexyl (meth)acrylate, or the coating resin is sodium alginate,
and
at least the active material is doped with at least one of lithium or lithium ions.

2. The coated negative electrode active material for lithium ion batteries according to claim 1,
wherein the at least one of lithium or lithium ions is doped from at least one of lithium metal or a positive electrode active material.

3. The coated negative electrode active material for lithium ion batteries according to claim 1,
wherein a volume average particle size of the coated negative electrode active material for lithium ion batteries is 0.01 to 100 μm.

4. The coated negative electrode active material for lithium ion batteries according to claim 1,
wherein the conductivity of the coating agent is 0.001 to 10 mS/cm.

5. The coated negative electrode active material for lithium ion batteries according to claim 1, wherein the coating resin has a liquid absorption rate of 10% or more when immersed in an electrolyte solution, and has a tensile strength at break of 10% or more when saturated with the electrolyte solution.

6. A slurry for lithium ion batteries, comprising:
the coated negative electrode active material for lithium ion batteries according to claim 1 and a dispersion medium.

7. The slurry for lithium ion batteries according to claim 6,
wherein the dispersion medium is an electrolyte solution.

8. A negative electrode for lithium ion batteries, comprising:
the coated negative electrode active material for lithium ion batteries according to claim 1, or
a slurry for lithium ion batteries comprising the coated negative electrode active material for lithium ion batteries according to claim 1 and a dispersion medium.

9. A lithium ion battery comprising:
the negative electrode for lithium ion batteries according to claim 8.

10. A lithium ion secondary battery comprising:
the negative electrode for lithium ion batteries according to claim 8,
wherein the irreversible capacity is 0.1 to 50 mAh/g.

* * * * *